United States Patent
Kumar et al.

(10) Patent No.: US 11,609,859 B2
(45) Date of Patent: *Mar. 21, 2023

(54) METHODS AND SYSTEMS FOR INVALIDATING MEMORY RANGES IN FABRIC-BASED ARCHITECTURES

(71) Applicant: Intel Corporation, Santa Clara, CA (US)

(72) Inventors: Karthik Kumar, Chandler, AZ (US); Thomas Willhalm, Sandhausen (DE); Francesc Guim Bernat, Barcelona (ES); Brian J. Slechta, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/950,233

(22) Filed: Nov. 17, 2020

(65) Prior Publication Data
US 2021/0073138 A1  Mar. 11, 2021

Related U.S. Application Data

(63) Continuation of application No. 15/376,447, filed on Dec. 12, 2016, now Pat. No. 10,846,230.

(51) Int. Cl.
*G06F 12/0891* (2016.01)
*G06F 9/30* (2018.01)

(52) U.S. Cl.
CPC ........ *G06F 12/0891* (2013.01); *G06F 9/3004* (2013.01); *G06F 9/30047* (2013.01); *G06F 2212/154* (2013.01); *G06F 2212/60* (2013.01)

(58) Field of Classification Search
None
See application file for complete search history.

(56) References Cited

U.S. PATENT DOCUMENTS

| | | |
|---|---|---|
| 5,551,001 A | 8/1996 | Cohen et al. |
| 5,802,582 A | 9/1998 | Ekanadham et al. |
| 5,890,217 A | 3/1999 | Kabemoto et al. |
| 5,940,860 A | 8/1999 | Hagersten et al. |
| 6,014,690 A | 1/2000 | Vandoren et al. |
| 6,154,816 A | 11/2000 | Steely et al. |
| 6,339,812 B1 * | 1/2002 | McCracken ........ G06F 11/2051 711/141 |
| 6,877,030 B2 | 4/2005 | Deneroff |
| 7,136,969 B1 * | 11/2006 | Niver .................. G06F 12/0808 711/141 |

(Continued)

OTHER PUBLICATIONS

Ex Parte Quayle Action, U.S. Appl. No. 15/376,447, Mar. 23, 2020, 7 pages.

(Continued)

*Primary Examiner* — Yaima Rigol
(74) *Attorney, Agent, or Firm* — Nicholson De Vos Webster & Elliott LLP

(57) ABSTRACT

Embodiments of the invention include a machine-readable medium having stored thereon at least one instruction, which if performed by a machine causes the machine to perform a method that includes decoding, with a node, an invalidate instruction; and executing, with the node, the invalidate instruction for invalidating a memory range specified across a fabric interconnect.

25 Claims, 24 Drawing Sheets

(56) References Cited

U.S. PATENT DOCUMENTS

| | | |
|---|---|---|
| 7,143,244 B2 | 11/2006 | Ling et al. |
| 8,977,821 B2* | 3/2015 | Bhoria ................ G06F 12/0891 711/144 |
| 2002/0069331 A1* | 6/2002 | Chauvel ................ G06F 1/206 711/144 |
| 2002/0078305 A1* | 6/2002 | Khare ................ G06F 12/0808 711/146 |
| 2003/0079085 A1 | 4/2003 | Ang |
| 2005/0160238 A1 | 7/2005 | Steely et al. |
| 2009/0083496 A1 | 3/2009 | Stevens, Jr. |
| 2009/0157981 A1* | 6/2009 | Kinter ................ G06F 9/3877 712/205 |
| 2009/0292857 A1* | 11/2009 | Tanabe ................ G06F 12/0891 711/3 |
| 2010/0241812 A1 | 9/2010 | Bekoou |
| 2014/0101390 A1* | 4/2014 | Sohi ................ G06F 12/0891 711/144 |
| 2014/0258635 A1 | 9/2014 | Hong et al. |
| 2014/0325167 A1 | 10/2014 | Slegel et al. |
| 2017/0185519 A1 | 6/2017 | Marshall et al. |
| 2017/0255557 A1 | 9/2017 | Robinson et al. |
| 2017/0262369 A1* | 9/2017 | Murphy ................ G11C 11/4091 |

OTHER PUBLICATIONS

Final Office Action, U.S. Appl. No. 15/376,447, dated Oct. 28, 2019, 15 pages.

Final Office Action, U.S. Appl. No. 15/376,447, dated Sep. 4, 2018, 14 pages.

Non-Final Office Action, U.S. Appl. No. 15/376,447, dated Mar. 12, 2018, 14 pages.

Non-Final Office Action, U.S. Appl. No. 15/376,447, dated May 8, 2019, 18 pages.

Notice of Allowance, U.S. Appl. No. 15/376,447, dated Jul. 29, 2020, 8 pages.

* cited by examiner

| 127 | 120 119 | 112 111 | 104 103 | | | | 24 23 | 16 15 | 8 7 | 0 |
|---|---|---|---|---|---|---|---|---|---|---|
| bbbb bbbb | bbbb bbbb | bbbb bbbb | • | • | • | | bbbb bbbb | bbbb bbbb | bbbb bbbb | |

UNSIGNED PACKED BYTE REPRESENTATION 344

| 127 | 120 119 | 112 111 | 104 103 | | | | 24 23 | 16 15 | 8 7 | 0 |
|---|---|---|---|---|---|---|---|---|---|---|
| sbbb bbbb | sbbb bbbb | sbbb bbbb | • | • | • | | sbbb bbbb | sbbb bbbb | sbbb bbbb | |

SIGNED PACKED BYTE REPRESENTATION 345

| 127 | 112 111 | | | | 16 15 | 0 |
|---|---|---|---|---|---|---|
| wwww wwww wwww wwww | | • | • | • | wwww wwww wwww wwww | |

UNSIGNED PACKED WORD REPRESENTATION 346

| 127 | 112 111 | | | | 16 15 | 0 |
|---|---|---|---|---|---|---|
| swww wwww wwww wwww | | • | • | • | swww wwww wwww wwww | |

SIGNED PACKED WORD REPRESENTATION 347

| 127 | 92 91 | 32 31 | 0 |
|---|---|---|---|
| dddd dddd dddd dddd dddd dddd dddd dddd | • • • | dddd dddd dddd dddd dddd dddd dddd dddd | |

UNSIGNED PACKED DOUBLEWORD REPRESENTATION 348

| 127 | 92 91 | 32 31 | 0 |
|---|---|---|---|
| sddd dddd dddd dddd dddd dddd dddd dddd | • • • | sddd dddd dddd dddd dddd dddd dddd dddd | |

SIGNED PACKED DOUBLEWORD REPRESENTATION 349

FIG. 3C

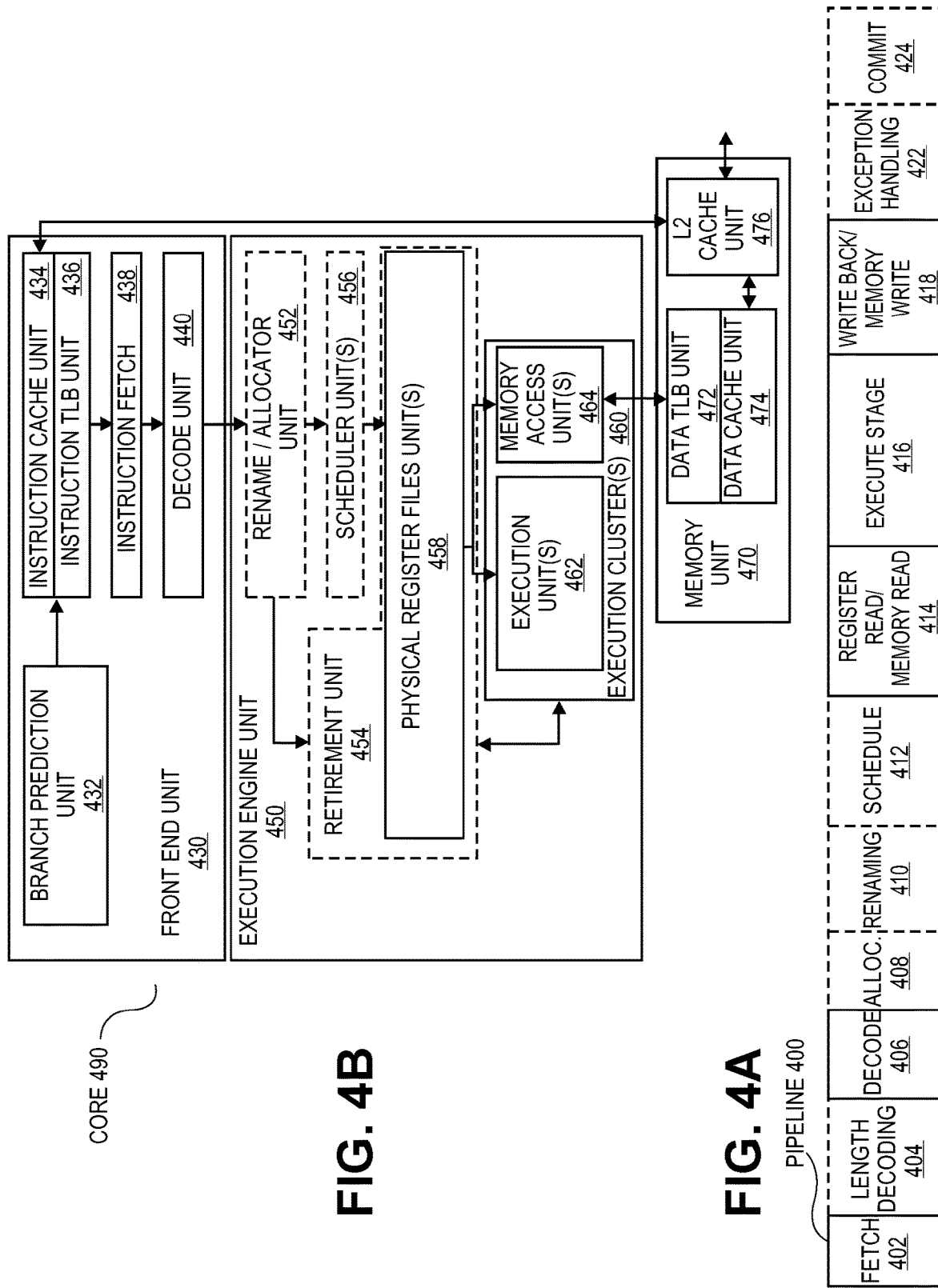

METHODS AND SYSTEMS FOR INVALIDATING MEMORY RANGES IN FABRIC-BASED ARCHITECTURES

FIELD OF THE INVENTION

The present disclosure pertains to the field of processing logic, microprocessors, and associated instruction set architecture that, when executed by the processor or other processing logic, perform logical, mathematical, or other functional operations including invalidating memory ranges in fabric-based distributed shared memory system architectures.

DESCRIPTION OF RELATED ART

With fabric latencies projected to reach within an order of memory latencies, a distributed shared memory (DSM) system can offer a large, single address space to a cluster of servers on a fabric; thus offering a scalable, cost-efficient alternative to "scale-up" node-controller systems. The burden of coherence within such an address space is left to application software with limited support/hooks from hardware. It is prohibitively expensive to offer full hardware coherence across an arbitrary set of nodes connected via high speed fabric.

A unique problem comes forth with the usage of such DSM systems. Application software has the ability to map and unmap memory regions with "write permissions" in such systems. An existing conventional approach includes having software to issue a series of individual cache line invalidates when it memory maps a shared memory region to write to it. This is necessary in order to prevent software from operating on stale data within that address range. Software does not know if the data from that range that is already in its cache is the latest data. Performing this approach on a line-by-line basis has the following problems. Expecting software applications to invalidate cache lines on a line-by-line basis for large memory regions is horribly inconvenient for application developers and software writers. Moreover, the hardware prefetchers will bring cache lines from within the mapped region into the cache, and this cannot be tracked by application software on a line-by-line basis. Individually issuing invalidates on a line-by-line basis is less efficient from a hardware perspective.

DESCRIPTION OF THE FIGURES

Embodiments are illustrated by way of example and not limitation in the Figures of the accompanying drawings:

FIG. 3C illustrates packed data types according to one embodiment;

FIG. 4A illustrates elements of a processor micro-architecture according to one embodiment;

FIG. 4B illustrates elements of a processor micro-architecture according to one embodiment;

DETAILED DESCRIPTION

Figure 1A:
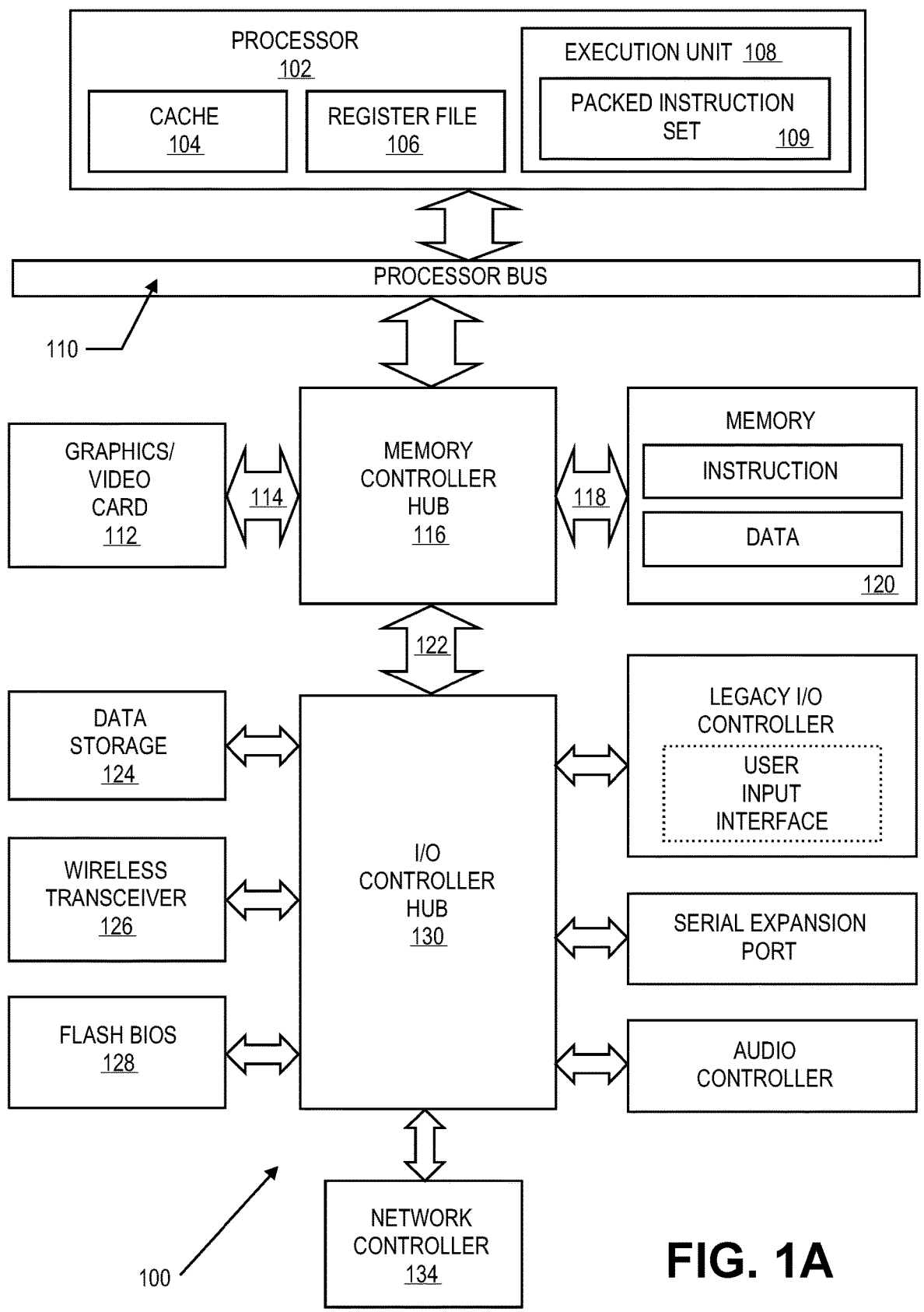
FIG. 1A is a block diagram of a system according to one embodiment.

The following description describes instructions and processing logic to perform invalidating memory ranges in fabric-based distributed shared memory system architectures within or in association with a processor, computer system, or other processing apparatus. In the following description, numerous specific details such as processing logic, processor types, micro-architectural conditions, events, enablement mechanisms, and the like are set forth in order to provide a more thorough understanding of embodiments of the present invention. It will be appreciated, however, by one skilled in the art that the invention may be practiced without such specific details. Additionally, some well known structures, circuits, and the like have not been shown in detail to avoid unnecessarily obscuring embodiments of the present invention.

Although the following embodiments are described with reference to a processor, other embodiments are applicable to other types of integrated circuits and logic devices. Similar techniques and teachings of embodiments of the present invention can be applied to other types of circuits or semiconductor devices that can benefit from higher pipeline throughput and improved performance. The teachings of embodiments of the present invention are applicable to any processor or machine that performs data manipulations. However, the present invention is not limited to processors or machines that perform 512 bit, 256 bit, 128 bit, 64 bit, 32 bit, or 16 bit data operations and can be applied to any processor and machine in which manipulation or management of data is performed. In addition, the following description provides examples, and the accompanying drawings show various examples for the purposes of illustration. However, these examples should not be construed in a limiting sense as they are merely intended to provide examples of embodiments of the present invention rather than to provide an exhaustive list of all possible implementations of embodiments of the present invention.

Although the below examples describe instruction handling and distribution in the context of execution units and logic circuits, other embodiments of the present invention can be accomplished by way of a data or instructions stored on a machine-readable, tangible medium, which when performed by a machine cause the machine to perform functions consistent with at least one embodiment of the invention. In one embodiment, functions associated with embodiments of the present invention are embodied in machine-executable instructions. The instructions can be used to cause a general-purpose or special-purpose processor that is programmed with the instructions to perform the steps of the present invention. Embodiments of the present invention may be provided as a computer program product or software which may include a machine or computer-readable medium having stored thereon instructions which may be used to program a computer (or other electronic devices) to perform one or more operations according to embodiments of the present invention. Alternatively, steps of embodiments of the present invention might be performed by specific hardware components that contain fixed-function logic for performing the steps, or by any combination of programmed computer components and fixed-function hardware components.

Instructions used to program logic to perform embodiments of the invention can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

In modern processors, a number of different execution units are used to process and execute a variety of code and instructions. Not all instructions are created equal as some are quicker to complete while others can take a number of clock cycles to complete. The faster the throughput of instructions, the better the overall performance of the processor. Thus it would be advantageous to have as many instructions execute as fast as possible. However, there are certain instructions that have greater complexity and require more in terms of execution time and processor resources. For example, there are floating point instructions, load/store operations, data moves, etc.

As more computer systems are used in internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output (I/O).

In one embodiment, the instruction set architecture (ISA) may be implemented by one or more micro-architectures, which includes processor logic and circuits used to implement one or more instruction sets. Accordingly, processors with different micro-architectures can share at least a portion of a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table (RAT), a Reorder Buffer (ROB) and a retirement register file. In one embodiment, registers may include one or more registers, register architectures, register files, or other register sets that may or may not be addressable by a software programmer.

In one embodiment, an instruction may include one or more instruction formats. In one embodiment, an instruction format may indicate various fields (number of bits, location of bits, etc.) to specify, among other things, the operation to be performed and the operand(s) on which that operation is to be performed. Some instruction formats may be further broken defined by instruction templates (or sub formats). For example, the instruction templates of a given instruction format may be defined to have different subsets of the instruction format's fields and/or defined to have a given field interpreted differently. In one embodiment, an instruction is expressed using an instruction format (and, if defined, in a given one of the instruction templates of that instruction format) and specifies or indicates the operation and the operands upon which the operation will operate.

Scientific, financial, auto-vectorized general purpose, RMS (recognition, mining, and synthesis), and visual and multimedia applications (e.g., 2D/3D graphics, image processing, video compression/decompression, voice recognition algorithms and audio manipulation) may require the same operation to be performed on a large number of data items. In one embodiment, Single Instruction Multiple Data (SIMD) refers to a type of instruction that causes a processor to perform an operation on multiple data elements. SIMD technology may be used in processors that can logically divide the bits in a register into a number of fixed-sized or variable-sized data elements, each of which represents a separate value. For example, in one embodiment, the bits in a 64-bit register may be organized as a source operand containing four separate 16-bit data elements, each of which represents a separate 16-bit value. This type of data may be referred to as 'packed' data type or 'vector' data type, and operands of this data type are referred to as packed data operands or vector operands. In one embodiment, a packed data item or vector may be a sequence of packed data elements stored within a single register, and a packed data operand or a vector operand may a source or destination operand of a SIMD instruction (or 'packed data instruction' or a 'vector instruction'). In one embodiment, a SIMD instruction specifies a single vector operation to be performed on two source vector operands to generate a destination vector operand (also referred to as a result vector operand) of the same or different size, with the same or different number of data elements, and in the same or different data element order.

SIMD technology, such as that employed by the Intel® Core™ processors having an instruction set including x86, MMX™, Streaming SIMD Extensions (SSE), SSE2, SSE3, SSE4.1, and SSE4.2 instructions, ARM processors, such as the ARM Cortex® family of processors having an instruction set including the Vector Floating Point (VFP) and/or NEON instructions, and MIPS processors, such as the Loongson family of processors developed by the Institute of Computing Technology (ICT) of the Chinese Academy of Sciences, has enabled a significant improvement in application performance (Core™ and MMX™ are registered trademarks or trademarks of Intel Corporation of Santa Clara, Calif.).

In one embodiment, destination and source registers/data are generic terms to represent the source and destination of the corresponding data or operation. In some embodiments, they may be implemented by registers, memory, or other storage areas having other names or functions than those depicted. For example, in one embodiment, "DEST1" may be a temporary storage register or other storage area, whereas "SRC1" and "SRC2" may be a first and second source storage register or other storage area, and so forth. In other embodiments, two or more of the SRC and DEST storage areas may correspond to different data storage elements within the same storage area (e.g., a SIMD register). In one embodiment, one of the source registers may also act as a destination register by, for example, writing back the result of an operation performed on the first and second source data to one of the two source registers serving as a destination registers.

FIG. 1A is a block diagram of an exemplary computer system formed with a processor that includes execution units to execute an instruction in accordance with one embodiment of the present invention. System 100 includes a component, such as a processor 102 to employ execution units including logic to perform algorithms for process data, in accordance with the present invention, such as in the embodiment described herein. System 100 is representative of processing systems based on the PENTIUM, CORE, Xeon, and/or Atom microprocessors available from Intel Corporation of Santa Clara, Calif., although other systems (including PCs having other microprocessors, engineering workstations, set-top boxes and the like) may also be used. In one embodiment, sample system 100 may execute a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

Embodiments are not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

FIG. 1A is a block diagram of a computer system 100 formed with a processor 102 that includes one or more execution units 108 to perform an algorithm to perform at least one instruction in accordance with one embodiment of the present invention. One embodiment may be described in the context of a single processor desktop or server system, but alternative embodiments can be included in a multiprocessor system. System 100 is an example of a 'hub' system architecture. The computer system 100 includes a processor 102 to process data signals. The processor 102 can be a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 102 is coupled to a processor bus 110 that can transmit data signals between the processor 102 and other components in the system 100. The elements of system 100 perform their conventional functions that are well known to those familiar with the art.

In one embodiment, the processor 102 includes a Level 1 (L1) internal cache memory 104. Depending on the architecture, the processor 102 can have a single internal cache or multiple levels of internal cache. Alternatively, in another embodiment, the cache memory can reside external to the processor 102. Other embodiments can also include a combination of both internal and external caches depending on the particular implementation and needs. Register file 106 can store different types of data in various registers including integer registers, floating point registers, status registers, and instruction pointer register.

Execution unit 108, including logic to perform integer and floating point operations, also resides in the processor 102. The processor 102 also includes a microcode (ucode) ROM that stores microcode for certain macroinstructions. For one embodiment, execution unit 108 includes logic to handle a packed instruction set 109. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications can be accelerated and executed more efficiently by using the full width of a processor's data bus for performing operations on packed data. This can eliminate the need to transfer smaller units of data across the processor's data bus to perform one or more operations one data element at a time.

Alternate embodiments of an execution unit 108 can also be used in micro controllers, embedded processors, graphics devices, DSPs, and other types of logic circuits. System 100 includes a memory 120. Memory 120 can be a dynamic random access memory (DRAM) device, a static random access memory (SRAM) device, flash memory device, or other memory device. Memory 120 can store instructions and/or data represented by data signals that can be executed by the processor 102.

In one embodiment a memory controller hub (MCH) 116 is coupled to the processor bus 110 and memory 120. The processor 102 can communicate to the MCH 116 via a processor bus 110. The MCH 116 is a system logic chip that provides a high bandwidth memory path 118 to memory 120 for instruction and data storage and for storage of graphics commands, data and textures. The MCH 116 is to direct data signals between the processor 102, memory 120, and other components in the system 100 and to bridge the data signals between processor bus 110, memory 120, and system I/O 122. In some embodiments, the system logic chip 116 can provide a graphics port for coupling to a graphics controller 112. The MCH 116 is coupled to memory 120 through a memory interface 118. The graphics card 112 is coupled to the MCH 116 through an Accelerated Graphics Port (AGP) interconnect 114.

In some embodiments the system I/O 122 is a proprietary hub interface bus that is used to couple the MCH 116 to the I/O controller hub (ICH) 130. The ICH 130 provides direct connections to some I/O devices via a local I/O bus. The local I/O bus is a high-speed I/O bus for connecting peripherals to the memory 120, chipset, and processor 102. Some examples are the audio controller, firmware hub (flash BIOS) 128, wireless transceiver 126, data storage 124, legacy I/O controller containing user input and keyboard interfaces, a serial expansion port such as Universal Serial Bus (USB), and a network controller 134. The data storage device 124 can comprise a hard disk drive, a floppy disk drive, a CD-ROM device, a flash memory device, or other mass storage device.

For another embodiment of a system, an instruction in accordance with one embodiment can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

Figure 1B:
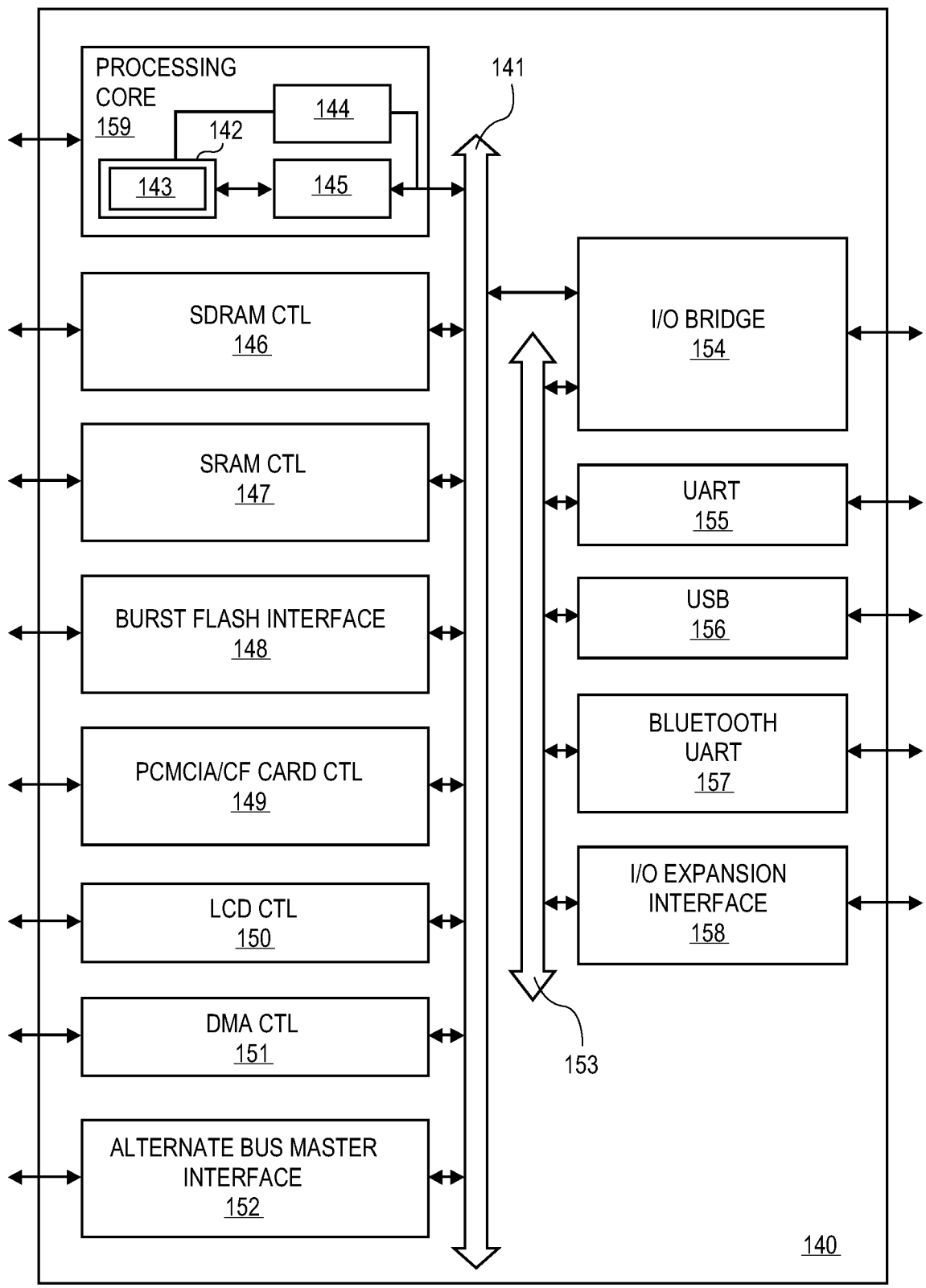
FIG. 1B is a block diagram of a system according to one embodiment.

FIG. 1B illustrates a data processing system 140 which implements the principles of one embodiment of the present invention. It will be readily appreciated by one of skill in the art that the embodiments described herein can be used with alternative processing systems without departure from the scope of embodiments of the invention.

The data processing system 140 comprises a processing core 159 capable of performing at least one instruction in accordance with one embodiment. For one embodiment, processing core 159 represents a processing unit of any type of architecture, including but not limited to CISC, RISC or VLIW type architecture. Processing core 159 may also be suitable for manufacture in one or more process technologies and by being represented on a machine readable media in sufficient detail, may be suitable to facilitate said manufacture.

Processing core 159 comprises an execution unit 142, a set of register file(s) 145, and a decoder 144. Processing core 159 also includes additional circuitry (not shown) which is not necessary to the understanding of embodiments of the present invention. Execution unit 142 is used for executing instructions received by processing core 159. In addition to performing typical processor instructions, execution unit 142 can perform instructions in packed instruction set 143 for performing operations on packed data formats. Packed instruction set 143 includes instructions for performing embodiments of the invention and other packed instructions. Execution unit 142 is coupled to register file 145 by an internal bus. Register file 145 represents a storage area on processing core 159 for storing information, including data. As previously mentioned, it is understood that the storage area used for storing the packed data is not critical. Execution unit 142 is coupled to decoder 144. Decoder 144 is used for decoding instructions received by processing core 159 into control signals and/or microcode entry points. In response to these control signals and/or microcode entry points, execution unit 142 performs the appropriate operations. In one embodiment, the decoder is used to interpret the opcode of the instruction, which will indicate what operation should be performed on the corresponding data indicated within the instruction.

Processing core 159 is coupled with bus 141 for communicating with various other system devices, which may include but are not limited to, for example, synchronous dynamic random access memory (SDRAM) control 146, static random access memory (SRAM) control 147, burst flash memory interface 148, personal computer memory card international association (PCMCIA)/compact flash (CF) card control 149, liquid crystal display (LCD) control 150, direct memory access (DMA) controller 151, and alternative bus master interface 152. In one embodiment, data processing system 140 may also comprise an I/O bridge 154 for communicating with various I/O devices via an I/O bus 153. Such I/O devices may include but are not limited to, for example, universal asynchronous receiver/transmitter (UART) 155, universal serial bus (USB) 156, Bluetooth wireless UART 157 and I/O expansion interface 158.

One embodiment of data processing system 140 provides for mobile, network and/or wireless communications and a processing core 159 capable of performing SIMD operations including a text string comparison operation. Processing core 159 may be programmed with various audio, video, imaging and communications algorithms including discrete transformations such as a Walsh-Hadamard transform, a fast Fourier transform (FFT), a discrete cosine transform (DCT), and their respective inverse transforms; compression/decompression techniques such as color space transformation, video encode motion estimation or video decode motion compensation; and modulation/demodulation (MODEM) functions such as pulse coded modulation (PCM).

Figure 1C:
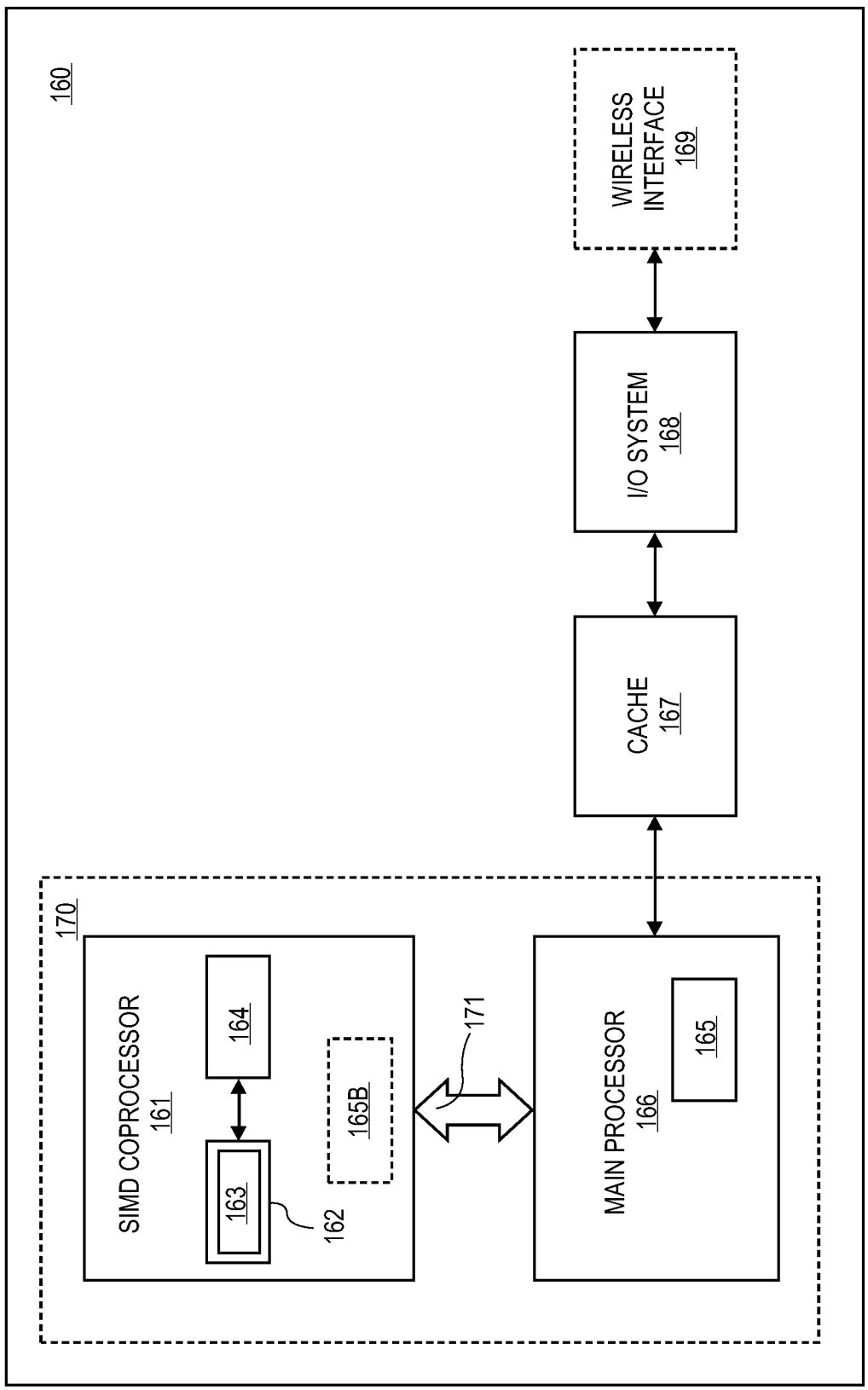
FIG. 1C is a block diagram of a system according to one embodiment.

FIG. 1C illustrates yet alternative embodiments of a data processing system capable of performing SIMD text string comparison operations. In accordance with one alternative embodiment, data processing system 160 may include a main processor 166, a SIMD coprocessor 161, a cache memory 167, and an input/output system 168. The input/output system 168 may optionally be coupled to a wireless interface 169. SIMD coprocessor 161 is capable of performing operations including instructions in accordance with one embodiment. Processing core 170 may be suitable for manufacture in one or more process technologies and by being represented on a machine readable media in sufficient detail, may be suitable to facilitate the manufacture of all or part of data processing system 160 including processing core 170.

For one embodiment, SIMD coprocessor 161 comprises an execution unit 162 and a set of register file(s) 164. One embodiment of main processor 165 comprises a decoder 165 to recognize instructions of instruction set 163 including instructions in accordance with one embodiment for execution by execution unit 162. For alternative embodiments, SIMD coprocessor 161 also comprises at least part of decoder 165B to decode instructions of instruction set 163. Processing core 170 also includes additional circuitry (not shown) which is not necessary to the understanding of embodiments of the present invention.

In operation, the main processor 166 executes a stream of data processing instructions that control data processing operations of a general type including interactions with the cache memory 167, and the input/output system 168. Embedded within the stream of data processing instructions are SIMD coprocessor instructions. The decoder 165 of main processor 166 recognizes these SIMD coprocessor instructions as being of a type that should be executed by an attached SIMD coprocessor 161. Accordingly, the main processor 166 issues these SIMD coprocessor instructions (or control signals representing SIMD coprocessor instructions) on the coprocessor bus 171MM where from they are received by any attached SIMD coprocessors. In this case, the SIMD coprocessor 161 will accept and execute any received SIMD coprocessor instructions intended for it.

Data may be received via wireless interface 169 for processing by the SIMD coprocessor instructions. For one example, voice communication may be received in the form of a digital signal, which may be processed by the SIMD coprocessor instructions to regenerate digital audio samples representative of the voice communications. For another example, compressed audio and/or video may be received in the form of a digital bit stream, which may be processed by the SIMD coprocessor instructions to regenerate digital audio samples and/or motion video frames. For one embodiment of processing core 170, main processor 166, and a SIMD coprocessor 161 are integrated into a single processing core 170 comprising an execution unit 162, a set of register file(s) 164, and a decoder 165 to recognize instructions of instruction set 163 including instructions in accordance with one embodiment.

Figure 2:
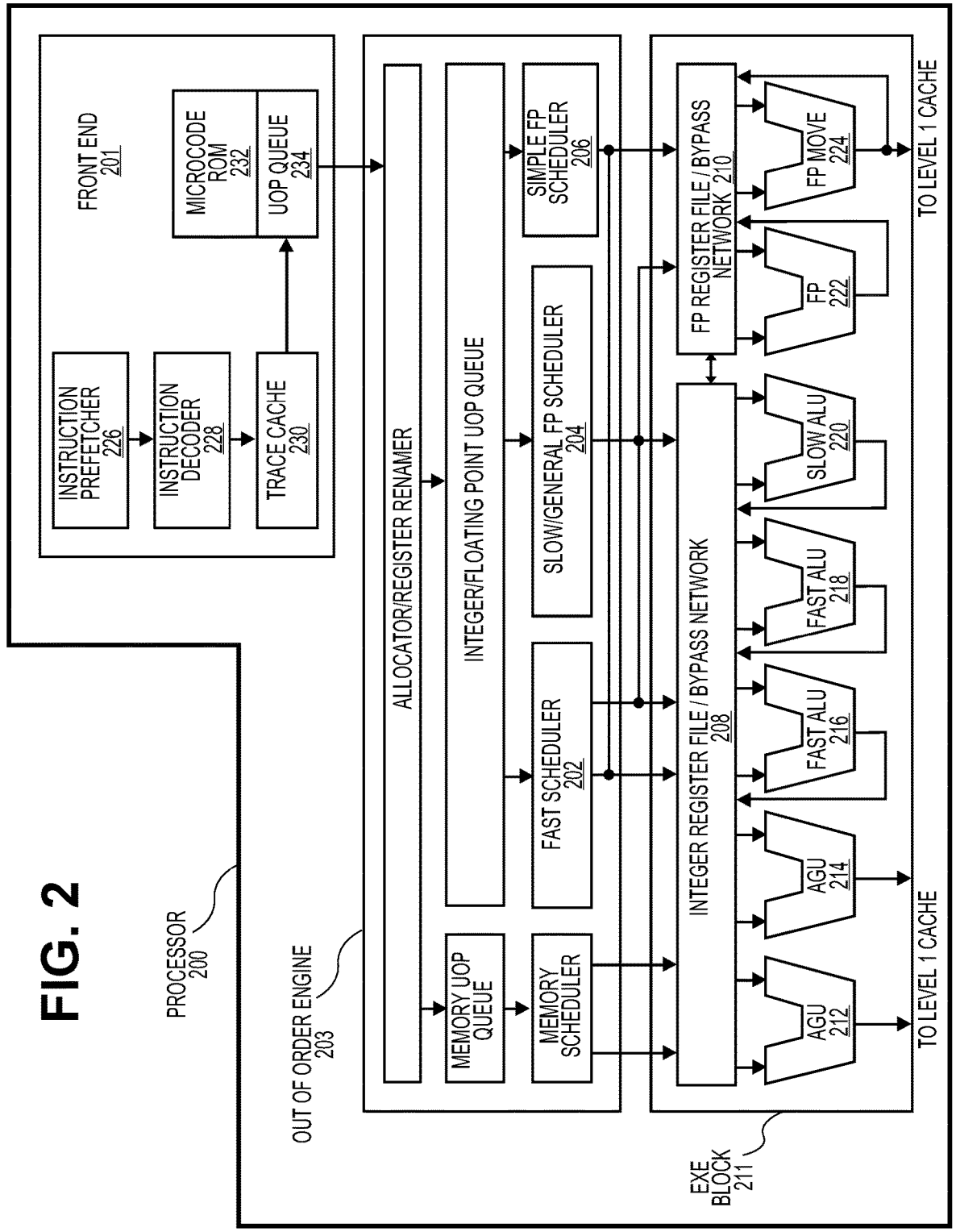
FIG. 2 is a block diagram of a processor according to one embodiment.

FIG. 2 is a block diagram of the micro-architecture for a processor 200 that includes logic circuits to perform instructions in accordance with one embodiment of the present invention. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 201 is the part of the processor 200 that fetches instructions to be executed and prepares them to be used later in the processor pipeline. The front end 201 may include several units. In one embodiment, the instruction prefetcher 226 fetches instructions from memory and feeds them to an instruction decoder 228 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 230 takes decoded uops and assembles them into program ordered sequences or traces in the uop queue 234 for execution. When the trace cache 230 encounters a complex instruction, the microcode ROM 232 provides the uops needed to complete the operation.

Some instructions are converted into a single micro-op, whereas others need several micro-ops to complete the full operation. In one embodiment, if more than four micro-ops are needed to complete a instruction, the decoder 228 accesses the microcode ROM 232 to do the instruction. For one embodiment, an instruction can be decoded into a small number of micro ops for processing at the instruction decoder 228. In another embodiment, an instruction can be stored within the microcode ROM 232 should a number of micro-ops be needed to accomplish the operation. The trace cache 230 refers to a entry point programmable logic array (PLA) to determine a correct micro-instruction pointer for reading the micro-code sequences to complete one or more instructions in accordance with one embodiment from the micro-code ROM 232. After the microcode ROM 232 finishes sequencing micro-ops for an instruction, the front end 201 of the machine resumes fetching micro-ops from the trace cache 230.

The out-of-order execution engine 203 is where the instructions are prepared for execution. The out-of-order execution logic has a number of buffers to smooth out and reorder the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 202, slow/general floating point scheduler 204, and simple floating point scheduler 206. The uop schedulers 202, 204, 206, determine when a uop is ready to execute based on the readiness of their dependent input register operand sources and the availability of the execution resources the uops need to complete their operation. The fast scheduler 202 of one embodiment can schedule on each half of the main clock cycle while the other schedulers can only schedule once per main processor clock cycle. The schedulers arbitrate for the dispatch ports to schedule uops for execution.

Register files 208, 210, sit between the schedulers 202, 204, 206, and the execution units 212, 214, 216, 218, 220, 222, 224 in the execution block 211. There is a separate register file 208, 210, for integer and floating point operations, respectively. Each register file 208, 210, of one embodiment also includes a bypass network that can bypass or forward just completed results that have not yet been written into the register file to new dependent uops. The integer register file 208 and the floating point register file 210 are also capable of communicating data with the other. For one embodiment, the integer register file 208 is split into two separate register files, one register file for the low order 32 bits of data and a second register file for the high order 32 bits of data. The floating point register file 210 of one embodiment has 128 bit wide entries because floating point instructions typically have operands from 64 to 128 bits in width.

The execution block 211 contains the execution units 212, 214, 216, 218, 220, 222, 224, where the instructions are actually executed. This section includes the register files 208, 210, that store the integer and floating point data operand values that the micro-instructions need to execute. The processor 200 of one embodiment is comprised of a number of execution units: address generation unit (AGU) 212, AGU 214, fast ALU 216, fast ALU 218, slow ALU 220, floating point ALU 222, floating point move unit 224. For one embodiment, the floating point execution blocks 222, 224, execute floating point, MMX, SIMD, and SSE, or other operations. The floating point ALU 222 of one embodiment includes a 64 bit by 64 bit floating point divider to execute divide, square root, and remainder micro-ops. For embodiments of the present invention, instructions involving a floating point value may be handled with the floating point hardware. In one embodiment, the ALU operations go to the high-speed ALU execution units 216, 218. The fast ALUs 216, 218, of one embodiment can execute fast operations with an effective latency of half a clock cycle. For one embodiment, most complex integer operations go to the slow ALU 220 as the slow ALU 220 includes integer execution hardware for long latency type of operations, such as a multiplier, shifts, flag logic, and branch processing. Memory load/store operations are executed by the AGUs 212, 214. For one embodiment, the integer ALUs 216, 218, 220, are described in the context of performing integer operations on 64 bit data operands. In alternative embodiments, the ALUs 216, 218, 220, can be implemented to support a variety of data bits including 16, 32, 128, 256, etc. Similarly, the floating point units 222, 224, can be implemented to support a range of operands having bits of various widths. For one embodiment, the floating point units 222, 224, can operate on 128 bits wide packed data operands in conjunction with SIMD and multimedia instructions.

In one embodiment, the uops schedulers 202, 204, 206, dispatch dependent operations before the parent load has finished executing. As uops are speculatively scheduled and executed in processor 200, the processor 200 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data. For the discussions below, the registers are understood to be data registers designed to hold packed data, such as 64 bit wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bit wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 3A:
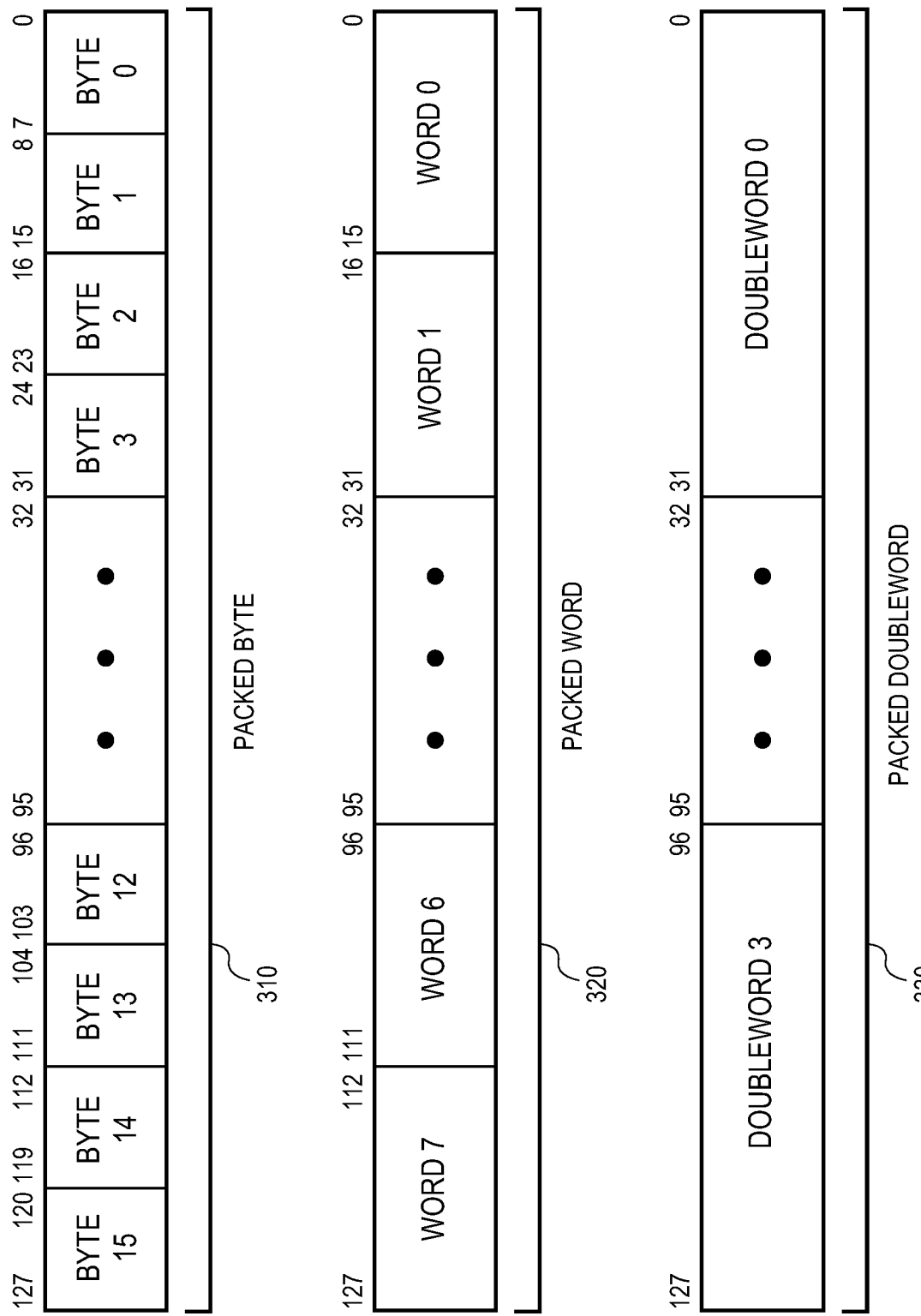
FIG. 3A illustrates packed data types according to one embodiment.

In the examples of the following figures, a number of data operands are described. FIG. 3A illustrates various packed data type representations in multimedia registers according to one embodiment of the present invention. FIG. 3A illustrates data types for a packed byte 310, a packed word 320, and a packed doubleword (dword) 330 for 128 bit wide operands. The packed byte format 310 of this example is 128 bits long and contains sixteen packed byte data elements. A byte is defined here as 8 bits of data. Information for each byte data element is stored in bit 7 through bit 0 for byte 0, bit 15 through bit 8 for byte 1, bit 23 through bit 16 for byte 2, and finally bit 120 through bit 127 for byte 15. Thus, all available bits are used in the register. This storage arrangement increases the storage efficiency of the processor. As well, with sixteen data elements accessed, one operation can now be performed on sixteen data elements in parallel.

Generally, a data element is an individual piece of data that is stored in a single register or memory location with other data elements of the same length. In packed data sequences relating to SSEx technology, the number of data elements stored in a XMM register is 128 bits divided by the length in bits of an individual data element. Similarly, in packed data sequences relating to MMX and SSE technology, the number of data elements stored in an MMX register is 64 bits divided by the length in bits of an individual data element. Although the data types illustrated in FIG. 3A are 128 bit long, embodiments of the present invention can also operate with 64 bit wide or other sized operands. The packed word format 320 of this example is 128 bits long and contains eight packed word data elements. Each packed word contains sixteen bits of information. The packed doubleword format 330 of FIG. 3A is 128 bits long and contains four packed doubleword data elements. Each packed doubleword data element contains thirty two bits of information. A packed quadword is 128 bits long and contains two packed quad-word data elements.

Figure 3B:
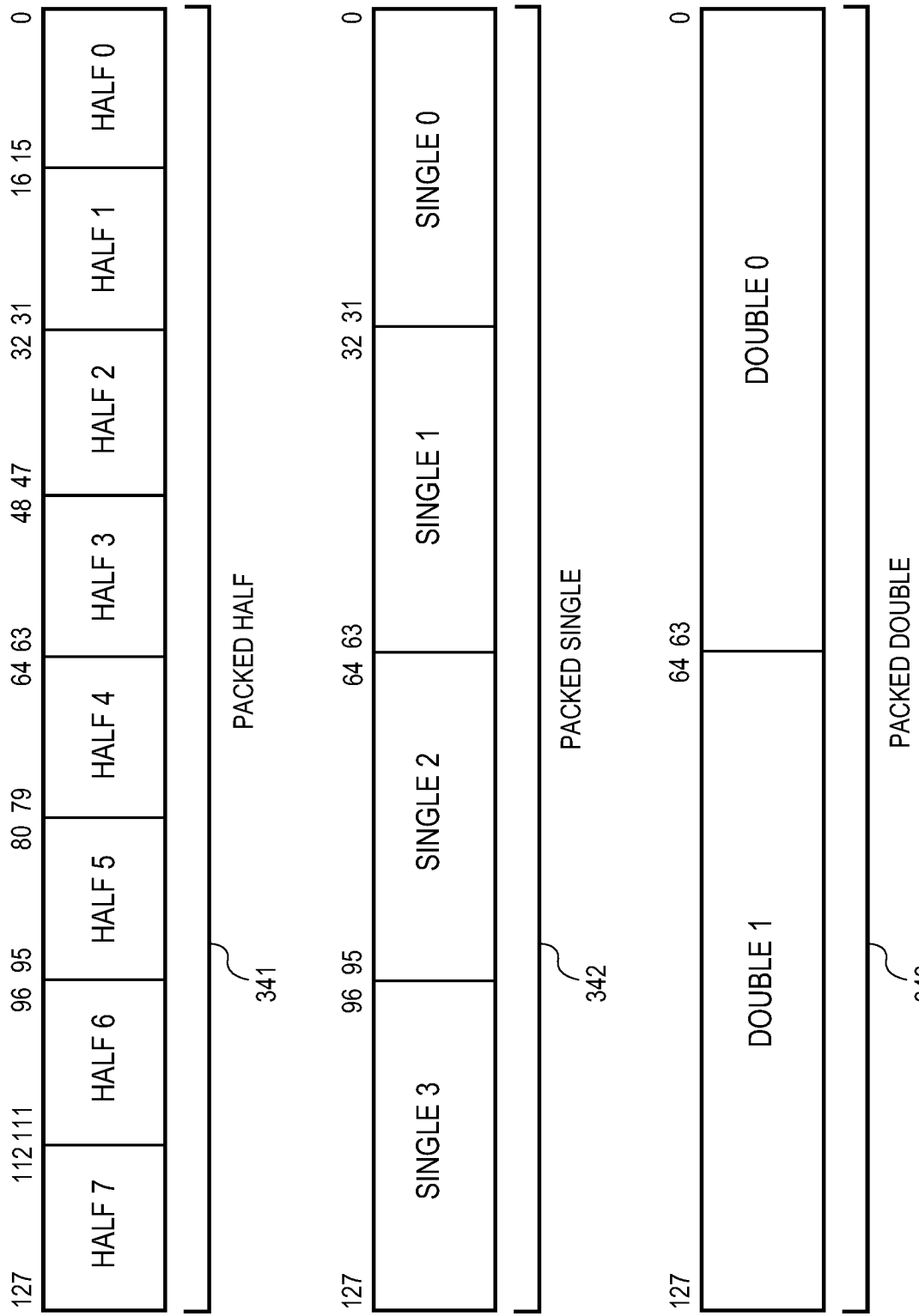
FIG. 3B illustrates packed data types according one embodiment.

FIG. 3B illustrates alternative in-register data storage formats. Each packed data can include more than one independent data element. Three packed data formats are illustrated; packed half 341, packed single 342, and packed double 343. One embodiment of packed half 341, packed single 342, and packed double 343 contain fixed-point data elements. For an alternative embodiment one or more of packed half 341, packed single 342, and packed double 343 may contain floating-point data elements. One alternative embodiment of packed half 341 is one hundred twenty-eight bits long containing eight 16-bit data elements. One embodiment of packed single 342 is one hundred twenty-eight bits long and contains four 32-bit data elements. One embodiment of packed double 343 is one hundred twenty-eight bits long and contains two 64-bit data elements. It will be appreciated that such packed data formats may be further extended to other register lengths, for example, to 96-bits, 160-bits, 192-bits, 224-bits, 256-bits or more.

FIG. 3C illustrates various signed and unsigned packed data type representations in multimedia registers according to one embodiment of the present invention. Unsigned packed byte representation 344 illustrates the storage of an unsigned packed byte in a SIMD register. Information for each byte data element is stored in bit seven through bit zero for byte zero, bit fifteen through bit eight for byte one, bit twenty-three through bit sixteen for byte two, and finally bit one hundred twenty through bit one hundred twenty-seven for byte fifteen. Thus, all available bits are used in the register. This storage arrangement can increase the storage efficiency of the processor. As well, with sixteen data elements accessed, one operation can now be performed on sixteen data elements in a parallel fashion. Signed packed byte representation 345 illustrates the storage of a signed packed byte. Note that the eighth bit of every byte data element is the sign indicator. Unsigned packed word representation 346 illustrates how word seven through word zero are stored in a SIMD register. Signed packed word representation 347 is similar to the unsigned packed word in-register representation 346. Note that the sixteenth bit of each word data element is the sign indicator. Unsigned packed doubleword representation 348 shows how doubleword data elements are stored. Signed packed doubleword representation 349 is similar to unsigned packed doubleword in-register representation 348. Note that the necessary sign bit is the thirty-second bit of each doubleword data element.

Figure 3D:
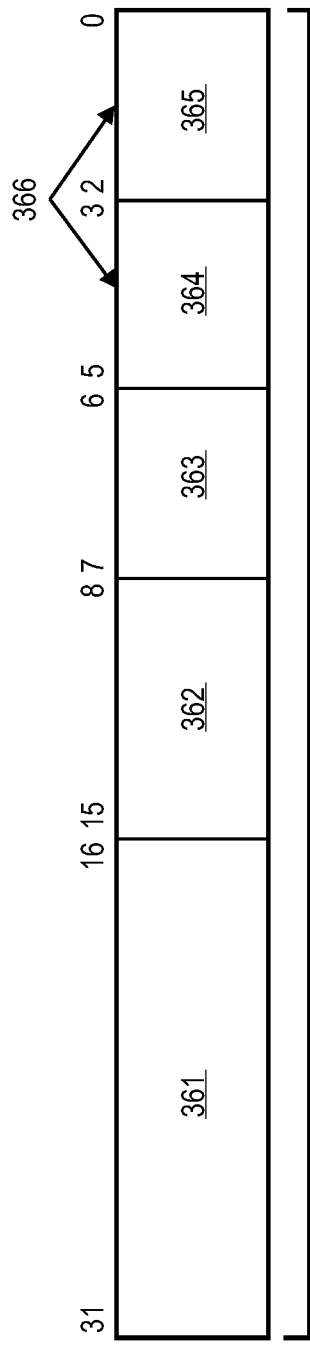
FIG. 3D illustrates an instruction encoding according to one embodiment.

FIG. 3D is a depiction of one embodiment of an operation encoding (opcode) format 360, having thirty-two or more bits, and register/memory operand addressing modes corresponding with a type of opcode format described in the "IA-32 Intel Architecture Software Developer's Manual Volume 2: Instruction Set Reference," which is which is available from Intel Corporation, Santa Clara, Calif. on the world-wide-web (www) at intel.com/design/litcentr. In one embodiment, and instruction may be encoded by one or more of fields 361 and 362. Up to two operand locations per instruction may be identified, including up to two source operand identifiers 364 and 365. For one embodiment, destination operand identifier 366 is the same as source operand identifier 364, whereas in other embodiments they are different. For an alternative embodiment, destination operand identifier 366 is the same as source operand identifier 365, whereas in other embodiments they are different. In one embodiment, one of the source operands identified by source operand identifiers 364 and 365 is overwritten by the results of the text string comparison operations, whereas in other embodiments identifier 364 corresponds to a source register element and identifier 365 corresponds to a destination register element. For one embodiment, operand identifiers 364 and 365 may be used to identify 32-bit or 64-bit source and destination operands.

Figure 3E:
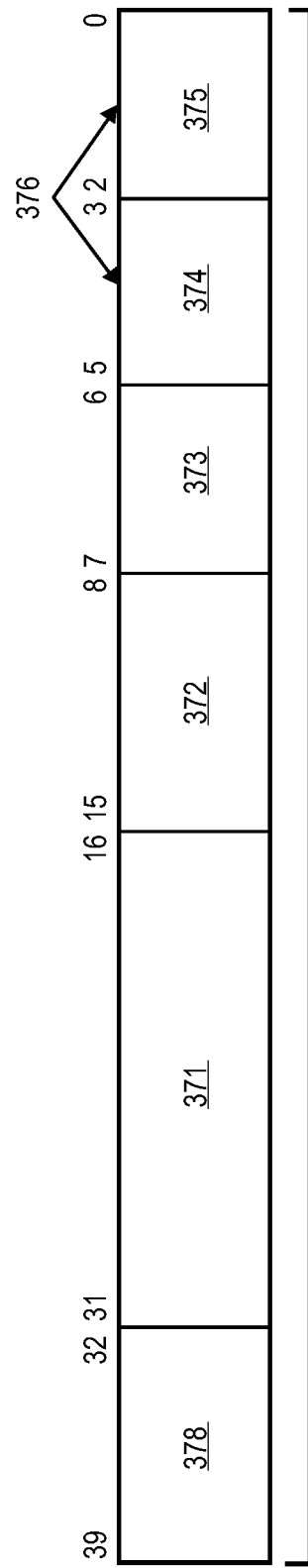
FIG. 3E illustrates an instruction encoding according to one embodiment.

FIG. 3E is a depiction of another alternative operation encoding (opcode) format 370, having forty or more bits. Opcode format 370 corresponds with opcode format 360 and comprises an optional prefix byte 378. An instruction according to one embodiment may be encoded by one or more of fields 378, 371, and 372. Up to two operand locations per instruction may be identified by source operand identifiers 374 and 375 and by prefix byte 378. For one embodiment, prefix byte 378 may be used to identify 32-bit or 64-bit source and destination operands. For one embodiment, destination operand identifier 376 is the same as source operand identifier 374, whereas in other embodiments they are different. For an alternative embodiment, destination operand identifier 376 is the same as source operand identifier 375, whereas in other embodiments they are different. In one embodiment, an instruction operates on one or more of the operands identified by operand identifiers 374 and 375 and one or more operands identified by the operand identifiers 374 and 375 is overwritten by the results of the instruction, whereas in other embodiments, operands identified by identifiers 374 and 375 are written to another data element in another register. Opcode formats 360 and 370 allow register to register, memory to register, register by memory, register by register, register by immediate, register to memory addressing specified in part by MOD fields 363 and 373 and by optional scale-index-base and displacement bytes.

Figure 3F:
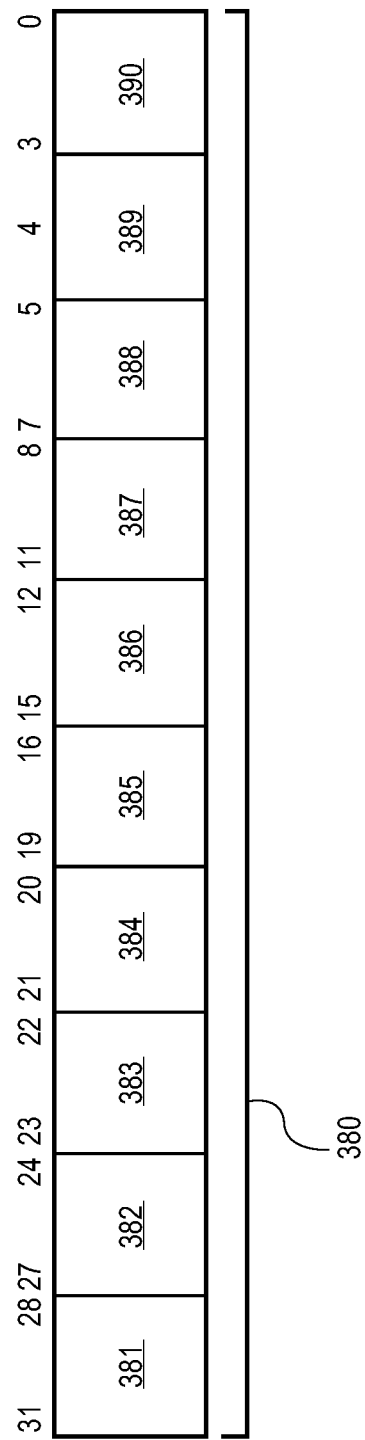
FIG. 3F illustrates an instruction encoding according to one embodiment.

Turning next to FIG. 3F, in some alternative embodiments, 64 bit single instruction multiple data (SIMD) arithmetic operations may be performed through a coprocessor data processing (CDP) instruction. Operation encoding (opcode) format 380 depicts one such CDP instruction having CDP opcode fields 382 and 389. The type of CDP instruction, for alternative embodiments, operations may be encoded by one or more of fields 383, 384, 387, and 388. Up to three operand locations per instruction may be identified, including up to two source operand identifiers 385 and 390 and one destination operand identifier 386. One embodiment of the coprocessor can operate on 8, 16, 32, and 64 bit values. For one embodiment, an instruction is performed on integer data elements. In some embodiments, an instruction may be executed conditionally, using condition field 381. For some embodiments, source data sizes may be encoded by field 383. In some embodiments, Zero (Z), negative (N), carry (C), and overflow (V) detection can be done on SIMD fields. For some instructions, the type of saturation may be encoded by field 384.

FIG. 4A is a block diagram illustrating an in-order pipeline and a register renaming stage, out-of-order issue/execution pipeline according to at least one embodiment of the invention. FIG. 4B is a block diagram illustrating an in-order architecture core and a register renaming logic, out-of-order issue/execution logic to be included in a processor according to at least one embodiment of the invention. The solid lined boxes in FIG. 4A illustrate the in-order pipeline, while the dashed lined boxes illustrates the register renaming, out-of-order issue/execution pipeline. Similarly, the solid lined boxes in FIG. 4B illustrate the in-order architecture logic, while the dashed lined boxes illustrates the register renaming logic and out-of-order issue/execution logic.

In FIG. 4A, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

In FIG. 4B, arrows denote a coupling between two or more units and the direction of the arrow indicates a direction of data flow between those units. FIG. 4B shows processor core 490 including a front end unit 430 coupled to an execution engine unit 450, and both are coupled to a memory unit 470.

The core 490 may be a reduced instruction set computing (RISC) core, a complex instruction set computing (CISC) core, a very long instruction word (VLIW) core, or a hybrid or alternative core type. As yet another option, the core 490 may be a special-purpose core, such as, for example, a network or communication core, compression engine, graphics core, or the like.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 434 is further coupled to a level 2 (L2) cache unit 476 in the memory unit 470. The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 458 is overlapped by the retirement unit 154 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.). Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 454 and the physical register file(s) unit(s) 458 are coupled to the execution cluster(s) 460. The execution cluster(s) 460 includes a set of one or more execution units 162 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The L2 cache unit 476 is coupled to one or more other levels of cache and eventually to a main memory.

By way of example, the exemplary register renaming, out-of-order issue/execution core architecture may implement the pipeline 400 as follows: 1) the instruction fetch 438 performs the fetch and length decoding stages 402 and 404; 2) the decode unit 440 performs the decode stage 406; 3) the rename/allocator unit 452 performs the allocation stage 408 and renaming stage 410; 4) the scheduler unit(s) 456 performs the schedule stage 412; 5) the physical register file(s) unit(s) 458 and the memory unit 470 perform the register read/memory read stage 414; the execution cluster 460 perform the execute stage 416; 6) the memory unit 470 and the physical register file(s) unit(s) 458 perform the write back/memory write stage 418; 7) various units may be involved in the exception handling stage 422; and 8) the retirement unit 454 and the physical register file(s) unit(s) 458 perform the commit stage 424.

The core 490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 5:
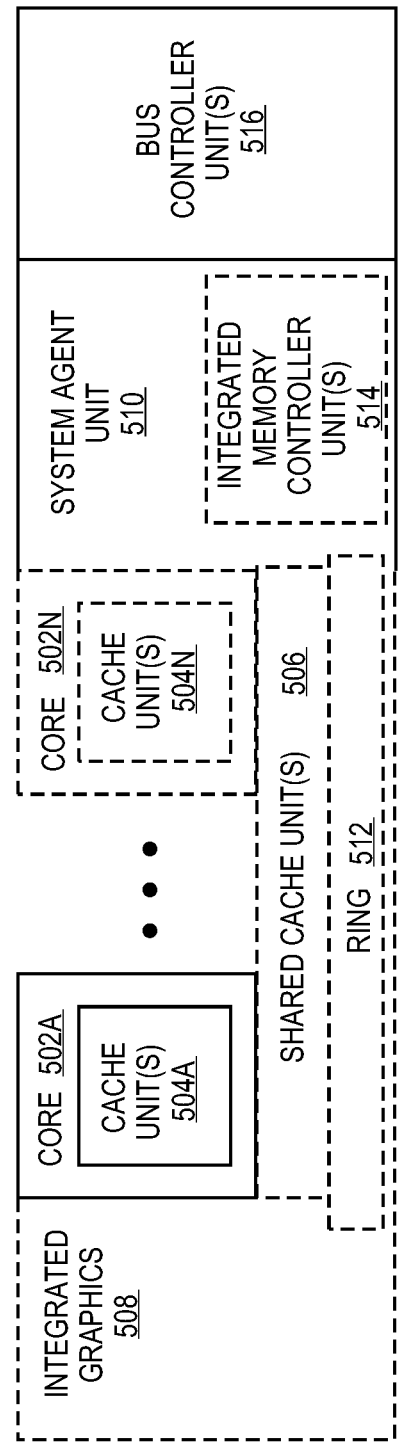
FIG. 5 is a block diagram of a processor according to one embodiment.

FIG. 5 is a block diagram of a single core processor and a multicore processor 500 with integrated memory controller and graphics according to embodiments of the invention. The solid lined boxes in FIG. 5 illustrate a processor 500 with a single core 502A, a system agent 510, a set of one or more bus controller units 516, while the optional addition of the dashed lined boxes illustrates an alternative processor 500 with multiple cores 502A-N, a set of one or more integrated memory controller unit(s) 514 in the system agent unit 510, and special purpose logic including integrated graphics logic 508. Each of processor cores 502A-502N includes one or more internal cache units 504A-504N. In some embodiments each processor core also has access to one or more shared cached units 506.

The internal cache units 504A-504N and shared cache units 506 represent a cache memory hierarchy within the processor 500. The cache memory hierarchy is a portion of an overall memory hierarchy for the processor that includes one or more internal cache units 504A-504N, the one or more shared cache units 506, and external memory (not shown) coupled to the set of integrated memory controller units 514. The set of shared cache units 506 may include one or more mid-level caches, such as level 2 (L2), level 3 (L3), level 4 (L4), or other levels of cache, a last level cache (LLC), and/or combinations thereof. While in one embodiment a ring based interconnect unit 512 interconnects the integrated graphics logic 508, the set of shared cache units 506, and the system agent unit 510, alternative embodiments may use any number of well-known techniques for interconnecting such units.

In some embodiments, one or more of the cores 502A-N are capable of multithreading. The system agent 510 includes those components coordinating and operating cores 502A-N. The system agent unit 510 may include for example a power control unit (PCU) and a display unit. The PCU may be or include logic and components needed for regulating the power state of the cores 502A-N and the integrated graphics logic 508. The display unit is for driving one or more externally connected displays.

The cores 502A-N may be homogenous or heterogeneous in terms of architecture and/or instruction set. For example, some of the cores 502A-N may be in order while others are out-of-order. As another example, two or more of the cores 502A-N may be capable of execution the same instruction set, while others may be capable of executing only a subset of that instruction set or a different instruction set.

The processor may be a general-purpose processor, such as a Core™ i3, i5, i7, 2 Duo and Quad, Xeon™, Itanium™, XScale™ or StrongARM™ processor, which are available from Intel Corporation, of Santa Clara, Calif. Alternatively, the processor may be from another company, such as ARM Holdings, Ltd, MIPS, etc. The processor may be a special-purpose processor, such as, for example, a network or communication processor, compression engine, graphics processor, co-processor, embedded processor, or the like. The processor may be implemented on one or more chips. The processor 500 may be a part of and/or may be implemented on one or more substrates using any of a number of process technologies, such as, for example, BiCMOS, CMOS, or NMOS.

Figure 6:
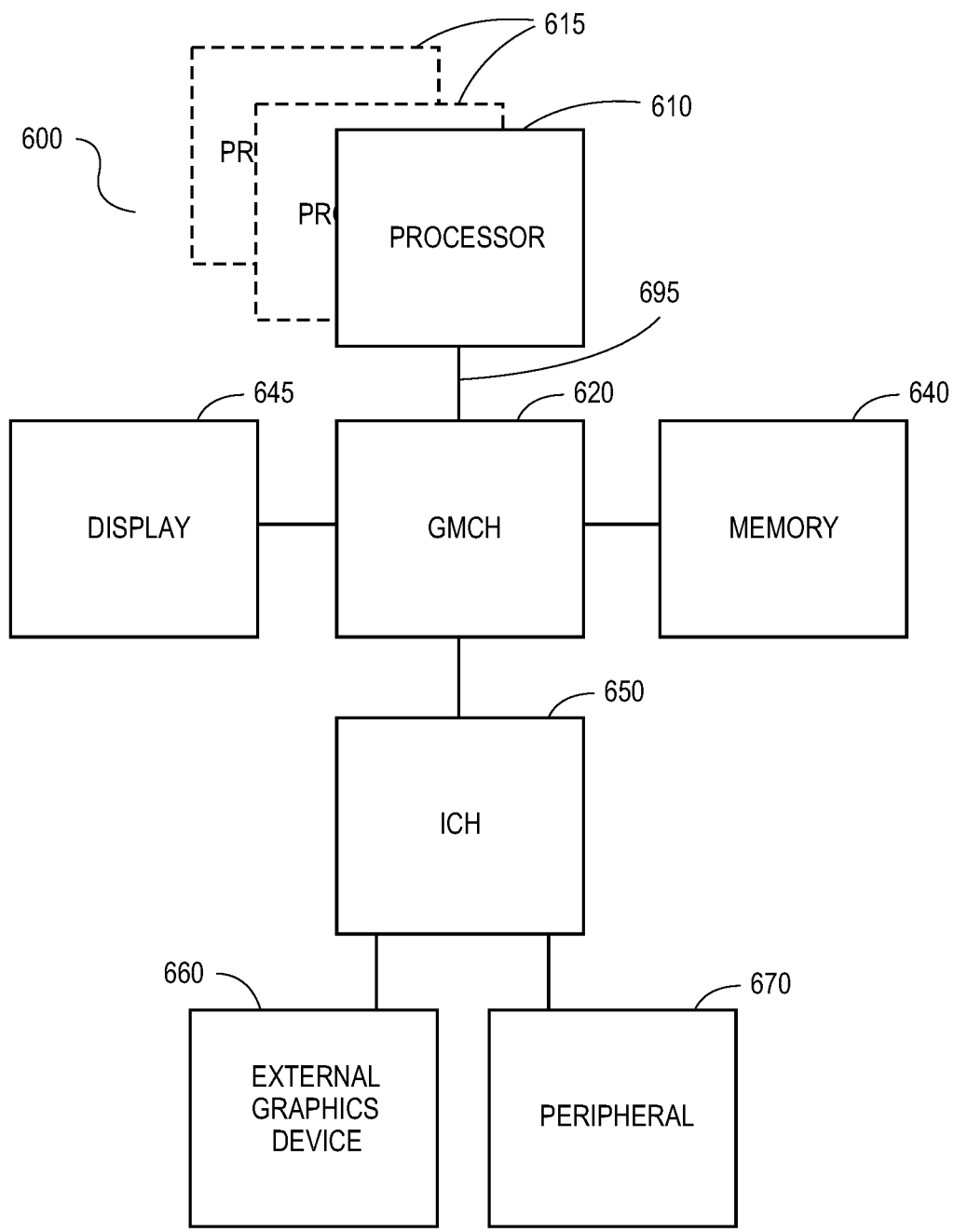
FIG. 6 is a block diagram of a computer system according to one embodiment.
Figure 7:
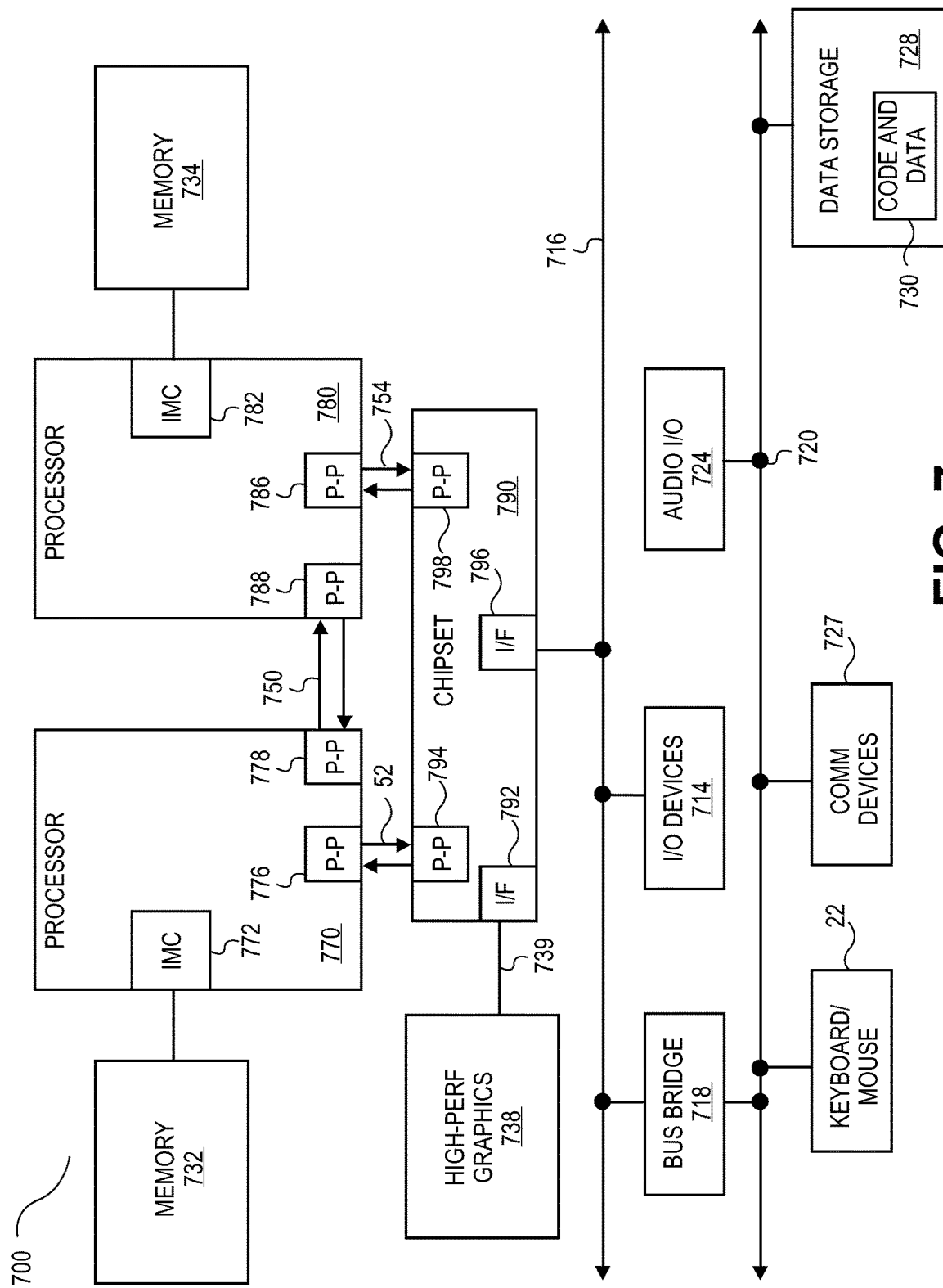
FIG. 7 is a block diagram of a computer system according to one embodiment.
Figure 8:
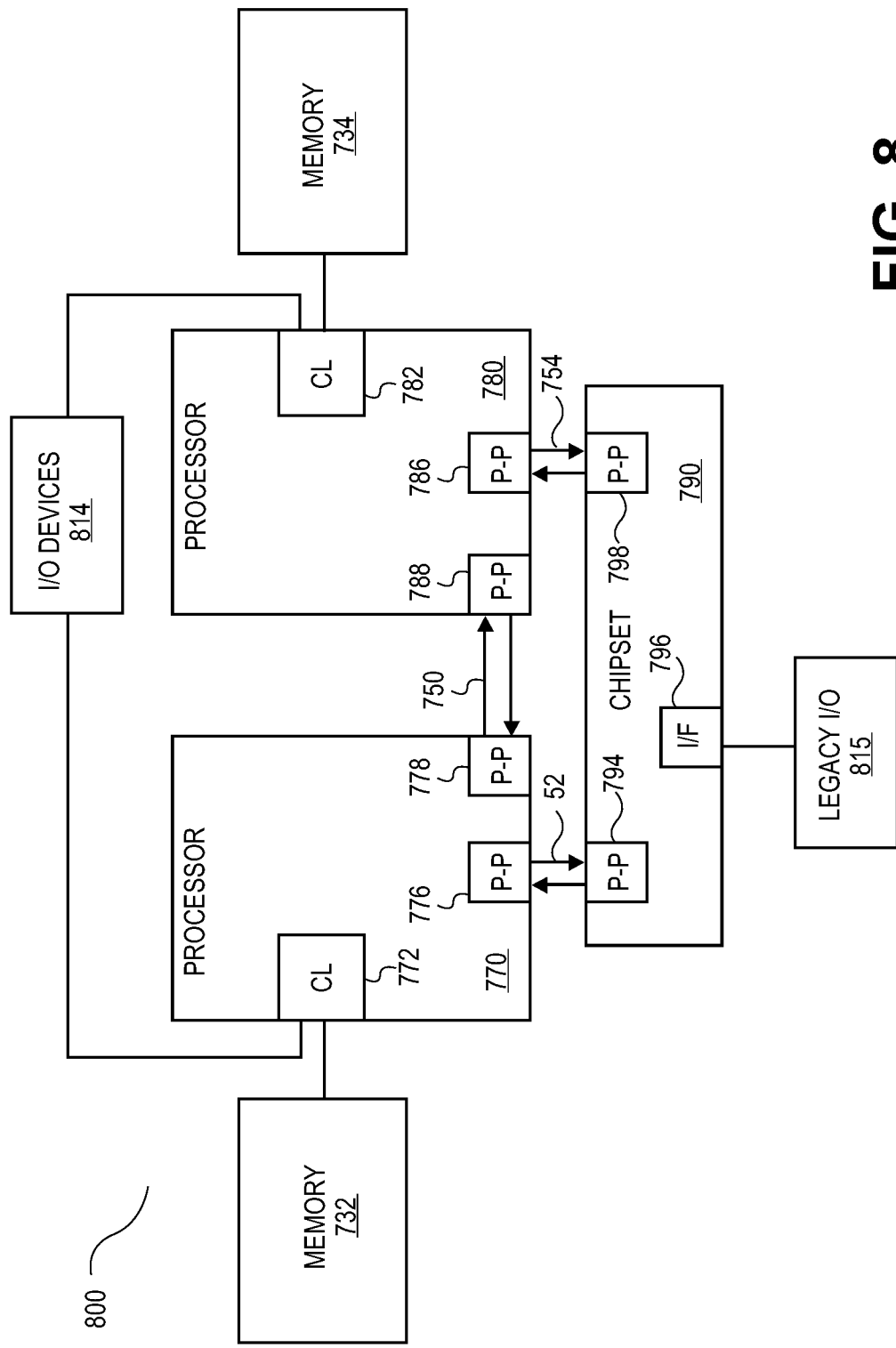
FIG. 8 is a block diagram of a computer system according to one embodiment.
Figure 9:
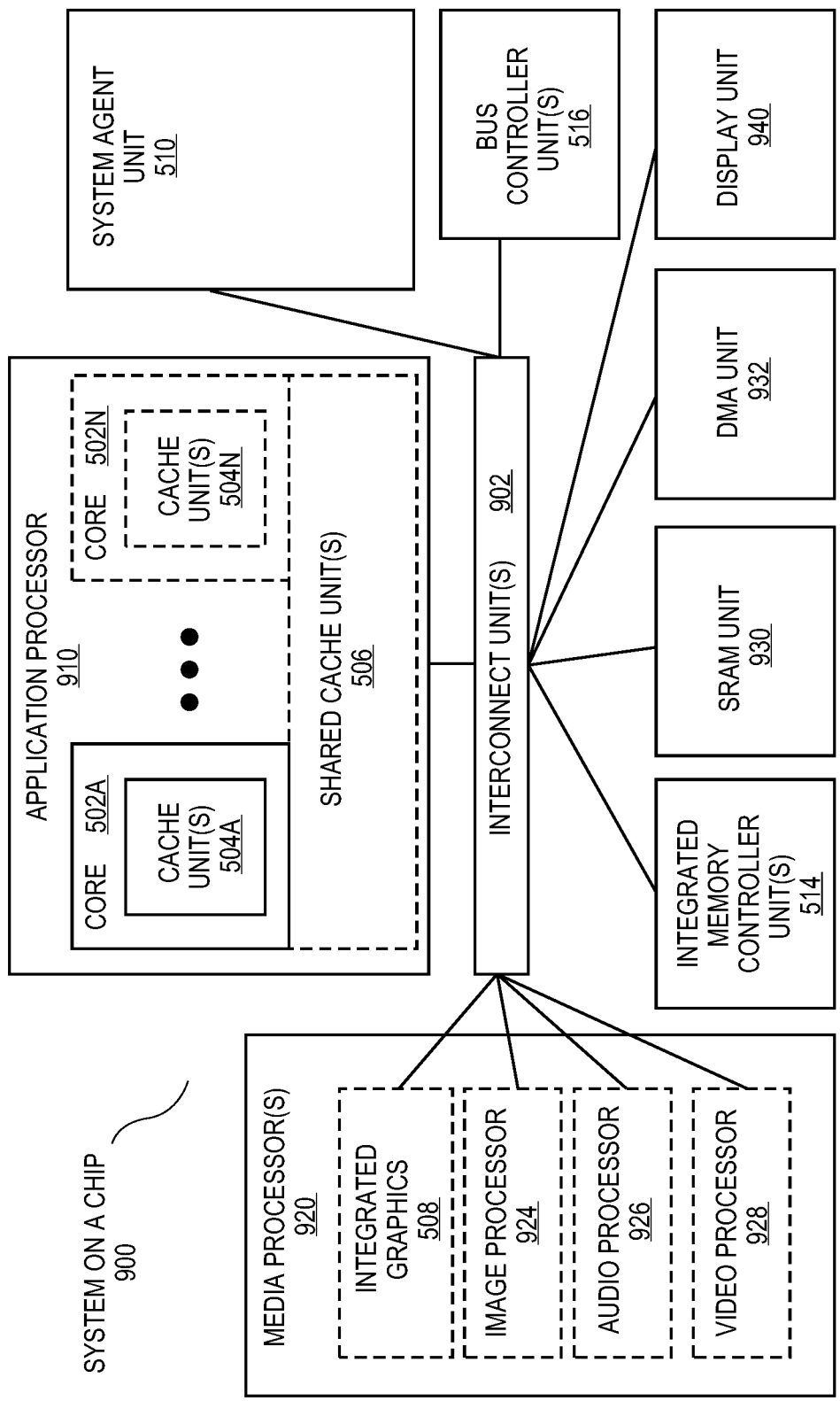
FIG. 9 is a block diagram of a system-on-a-chip according to one embodiment.

FIGS. 6-8 are exemplary systems suitable for including the processor 500, while FIG. 9 is an exemplary system on a chip (SoC) that may include one or more of the cores 502. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 6, shown is a block diagram of a system 600 in accordance with one embodiment of the present invention. The system 600 may include one or more processors 610, 615, which are coupled to graphics memory controller hub (GMCH) 620. The optional nature of additional processors 615 is denoted in FIG. 6 with broken lines.

Each processor 610,615 may be some version of the processor 500. However, it should be noted that it is unlikely that integrated graphics logic and integrated memory control units would exist in the processors 610,615. FIG. 6 illustrates that the GMCH 620 may be coupled to a memory 640 that may be, for example, a dynamic random access memory (DRAM). The DRAM may, for at least one embodiment, be associated with a non-volatile cache.

The GMCH 620 may be a chipset, or a portion of a chipset. The GMCH 620 may communicate with the processor(s) 610, 615 and control interaction between the processor(s) 610, 615 and memory 640. The GMCH 620 may also act as an accelerated bus interface between the processor(s) 610, 615 and other elements of the system 600. For at least one embodiment, the GMCH 620 communicates with the processor(s) 610, 615 via a multi-drop bus, such as a frontside bus (FSB) 695.

Furthermore, GMCH 620 is coupled to a display 645 (such as a flat panel display). GMCH 620 may include an integrated graphics accelerator. GMCH 620 is further coupled to an input/output (I/O) controller hub (ICH) 650, which may be used to couple various peripheral devices to system 600. Shown for example in the embodiment of FIG. 6 is an external graphics device 660, which may be a discrete graphics device coupled to ICH 650, along with another peripheral device 670.

Alternatively, additional or different processors may also be present in the system 600. For example, additional processor(s) 615 may include additional processors(s) that are the same as processor 610, additional processor(s) that are heterogeneous or asymmetric to processor 610, accelerators (such as, e.g., graphics accelerators or digital signal processing (DSP) units), field programmable gate arrays, or any other processor. There can be a variety of differences between the physical resources 610, 615 in terms of a spectrum of metrics of merit including architectural, microarchitectural, thermal, power consumption characteristics, and the like. These differences may effectively manifest themselves as asymmetry and heterogeneity amongst the processors 610, 615. For at least one embodiment, the various processors 610, 615 may reside in the same die package. In another embodiment, the processors 610, 615 are located at separate nodes (e.g., separate server) with different coherency domains.

Referring now to FIG. 7, shown is a block diagram of a second system 700 in accordance with an embodiment of the present invention. As shown in FIG. 7, multiprocessor system 700 is a point-to-point interconnect system, and includes a first processor 770 and a second processor 780 coupled via a point-to-point interconnect 750. Each of processors 770 and 780 may be some version of the processor 500 as one or more of the processors 610,615.

While shown with only two processors 770, 780, it is to be understood that the scope of the present invention is not so limited. In other embodiments, one or more additional processors may be present in a given processor.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 across a high-performance graphics interface 739 that is coupled with the chipset 790 via an interface 792.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present invention is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Referring now to FIG. 8, shown is a block diagram of a third system 800 in accordance with an embodiment of the present invention. Like elements in FIGS. 7 and 8 bear like reference numerals, and certain aspects of FIG. 7 have been omitted from FIG. 8 in order to avoid obscuring other aspects of FIG. 8.

FIG. 8 illustrates that the processors 870, 880 may include integrated memory and I/O control logic ("CL") 872 and 882, respectively. For at least one embodiment, the CL 872, 882 may include integrated memory controller units such as the integrated memory controller unit(s) 514 of FIG. 5 and the IMCs 772 and 782 of FIG. 7. In addition. CL 872, 882 may also include I/O control logic. FIG. 8 illustrates that not only are the memories 732, 734 coupled to the CL 872, 882, but also that one or more I/O device(s) 814 are also coupled to the control logic 872, 882. Legacy I/O devices 815 may be coupled to the chipset 790, for example, if those devices are not or cannot be coupled via the CL 872, 882.

Referring now to FIG. 9, shown is a block diagram of a SoC 900 in accordance with an embodiment of the present invention. Similar elements in FIG. 5 bear like reference numerals. Also, dashed lined boxes are optional features on more advanced SoCs. In FIG. 9, an interconnect unit(s) 902 is coupled to: an application processor 910 which includes a set of one or more cores 502A-N including internal cache unit(s) 504A-N and shared cache unit(s) 506; a system agent unit 510; a bus controller unit(s) 516; an integrated memory controller unit(s) 514; a set or one or more media processors 920 which may include integrated graphics logic 508, an image processor 924 for providing still and/or video camera functionality, an audio processor 926 for providing hardware audio acceleration, and a video processor 928 for providing video encode/decode acceleration; an static random access memory (SRAM) unit 930; a direct memory access (DMA) unit 932; and a display unit 940 for coupling to one or more external displays.

Figure 10:
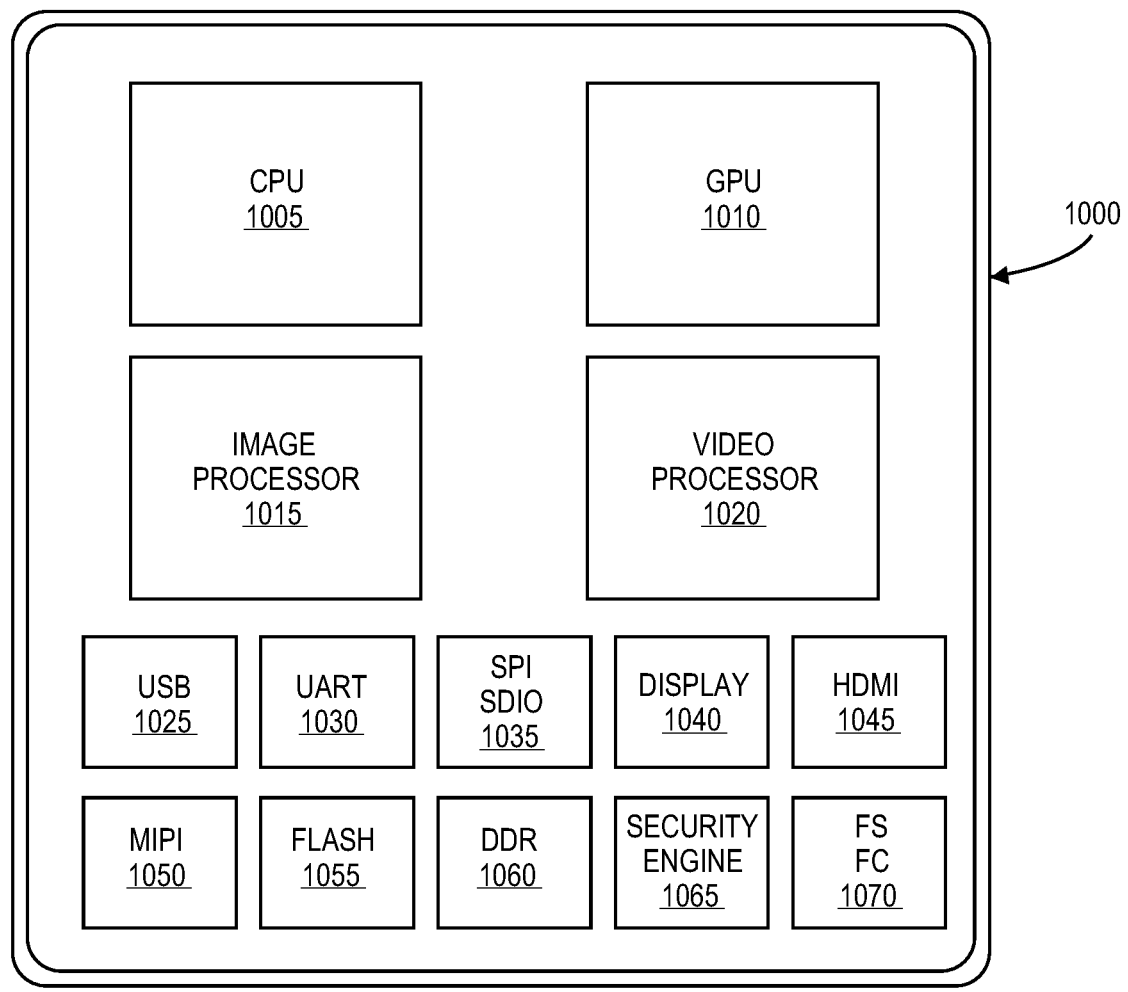
FIG. 10 is a block diagram of a processor according to one embodiment.

FIG. 10 illustrates a processor containing a central processing unit (CPU) and a graphics processing unit (GPU), which may perform at least one instruction according to one embodiment. In one embodiment, an instruction to perform operations according to at least one embodiment could be performed by the CPU. In another embodiment, the instruction could be performed by the GPU. In still another embodiment, the instruction may be performed through a combination of operations performed by the GPU and the CPU. For example, in one embodiment, an instruction in accordance with one embodiment may be received and decoded for execution on the GPU. However, one or more operations within the decoded instruction may be performed by a CPU and the result returned to the GPU for final retirement of the instruction. Conversely, in some embodiments, the CPU may act as the primary processor and the GPU as the co-processor.

In some embodiments, instructions that benefit from highly parallel, throughput processors may be performed by the GPU, while instructions that benefit from the performance of processors that benefit from deeply pipelined architectures may be performed by the CPU. For example, graphics, scientific applications, financial applications and other parallel workloads may benefit from the performance of the GPU and be executed accordingly, whereas more sequential applications, such as operating system kernel or application code may be better suited for the CPU.

In FIG. 10, processor 1000 includes a CPU 1005, GPU 1010, image processor 1015, video processor 1020, USB controller 1025, UART controller 1030, SPI/SDIO controller 1035, display device 1040, HDMI interface 1045, MIPI controller 1050, flash memory controller 1055, dual data rate (DDR) controller 1060, security engine 1065, and I$^2$S/I$^2$C controller 1070. Other logic and circuits may be included in the processor of FIG. 10, including more CPUs or GPUs and other peripheral interface controllers.

One or more aspects of at least one embodiment may be implemented by representative data stored on a machine-readable medium which represents various logic within the processor, which when read by a machine causes the machine to fabricate logic to perform the techniques described herein. Such representations, known as "IP cores" may be stored on a tangible, machine readable medium ("tape") and supplied to various customers or manufacturing facilities to load into the fabrication machines 1165 that actually make the logic or processor. For example, IP cores, such as the Cortex™ family of processors developed by ARM Holdings, Ltd. and Loongson IP cores developed the Institute of Computing Technology (ICT) of the Chinese Academy of Sciences may be licensed or sold to various customers or licensees, such as Texas Instruments, Qualcomm, Apple, or Samsung and implemented in processors produced by these customers or licensees.

Figure 11:
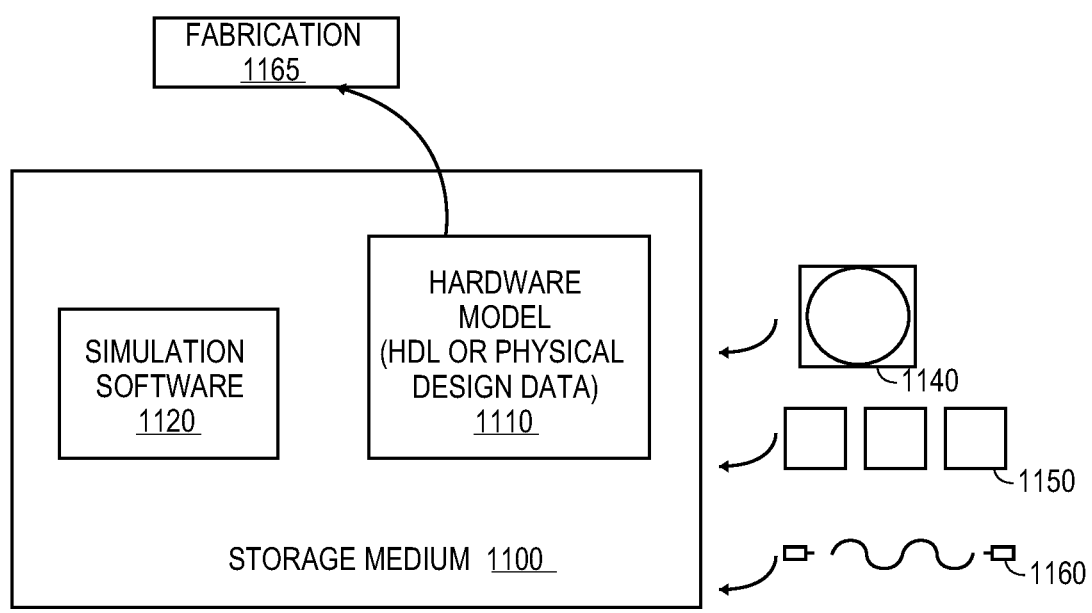
FIG. 11 is a block diagram of an IP core development system according to one embodiment.

FIG. 11 shows a block diagram illustrating the development of IP cores according to one embodiment. A Storage medium 1100 includes simulation software 1120 and/or hardware or software model 1110. In one embodiment, the data representing the IP core design can be provided to the storage medium 1100 via memory 1140 (e.g., hard disk), wired connection (e.g., internet) 1150 or wireless connection 1160. The IP core information generated by the simulation tool and model can then be transmitted to a fabrication facility where it can be fabricated by a $3^{rd}$ party to perform at least one instruction in accordance with at least one embodiment.

In some embodiments, one or more instructions may correspond to a first type or architecture (e.g., x86) and be translated or emulated on a processor of a different type or architecture (e.g., ARM). An instruction, according to one embodiment, may therefore be performed on any processor or processor type, including ARM, x86, MIPS, a GPU, or other processor type or architecture.

Figure 12:
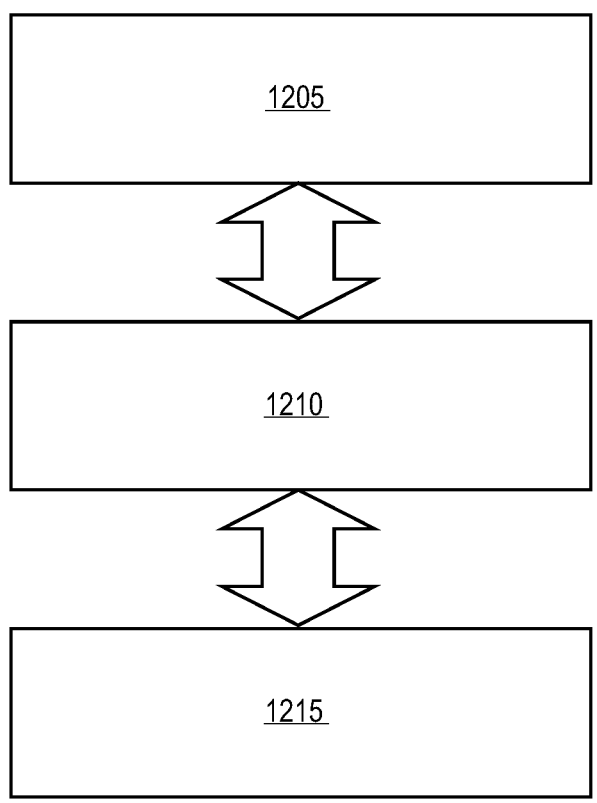
FIG. 12 illustrates an architecture emulation system according to one embodiment.

FIG. 12 illustrates how an instruction of a first type is emulated by a processor of a different type, according to one embodiment. In FIG. 12, program 1205 contains some instructions that may perform the same or substantially the same function as an instruction according to one embodiment. However the instructions of program 1205 may be of a type and/or format that is different or incompatible with processor 1215, meaning the instructions of the type in program 1205 may not be able to executed natively by the processor 1215. However, with the help of emulation logic, 1210, the instructions of program 1205 are translated into instructions that are natively capable of being executed by the processor 1215. In one embodiment, the emulation logic is embodied in hardware. In another embodiment, the emulation logic is embodied in a tangible, machine-readable medium containing software to translate instructions of the type in the program 1205 into the type natively executable by the processor 1215. In other embodiments, emulation logic is a combination of fixed-function or programmable hardware and a program stored on a tangible, machine-readable medium. In one embodiment, the processor contains the emulation logic, whereas in other embodiments, the emulation logic exists outside of the processor and is provided by a third party. In one embodiment, the processor is capable of loading the emulation logic embodied in a tangible, machine-readable medium containing software by executing microcode or firmware contained in or associated with the processor.

Figure 13:
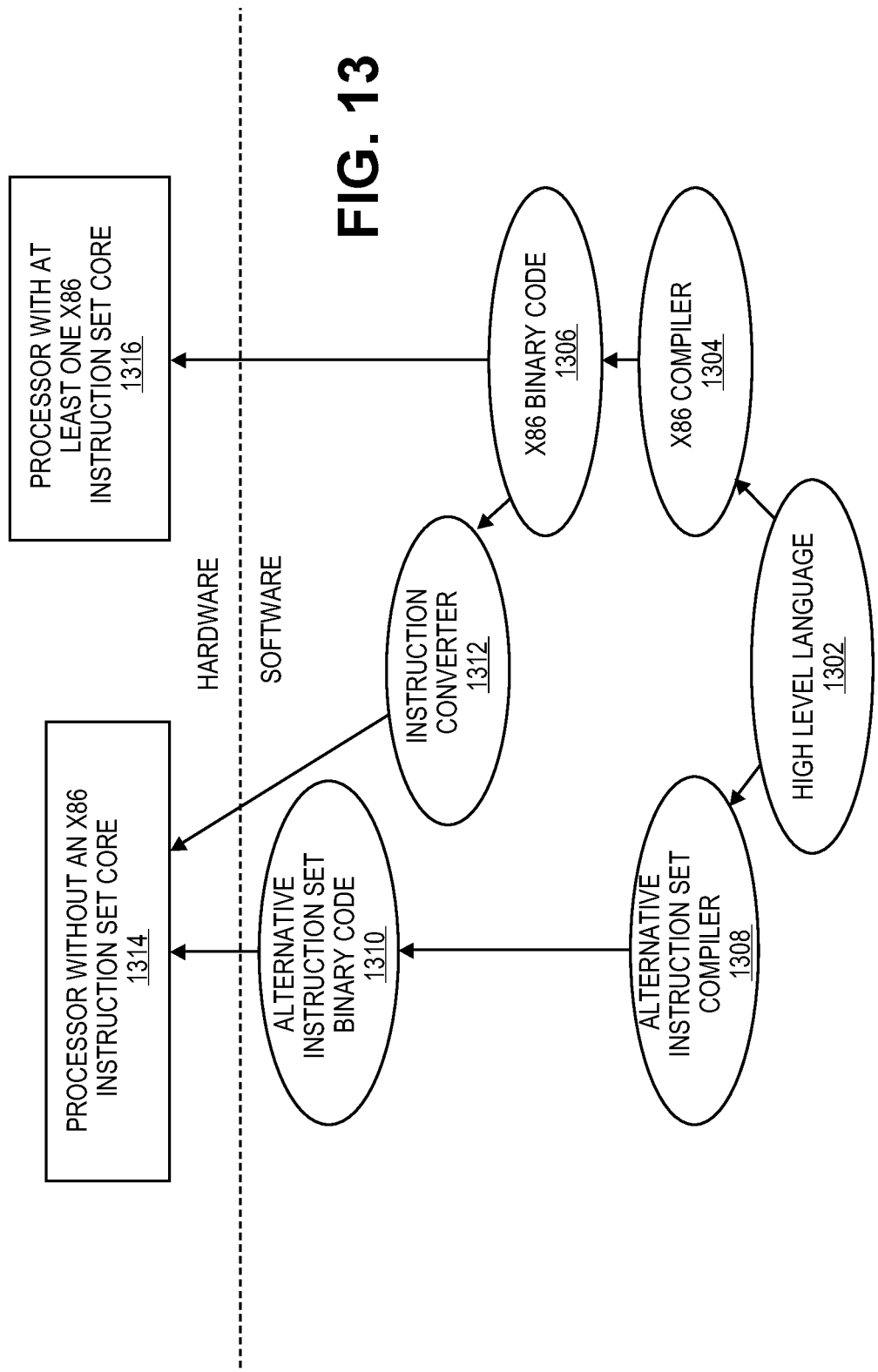
FIG. 13 illustrates a system to translate instructions according to one embodiment.

FIG. 13 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 13 shows a program in a high level language 1302 may be compiled using an x86 compiler 1304 to generate x86 binary code 1306 that may be natively executed by a processor with at least one x86 instruction set core 1316. The processor with at least one x86 instruction set core 1316 represents any processor that can perform substantially the same functions as a Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1304 represents a compiler that is operable to generate x86 binary code 1306 (e.g., object code) that can, with or without additional linkage processing, be executed on the processor with at least one x86 instruction set core 1316. Similarly, FIG. 13 shows the program in the high level language 1302 may be compiled using an alternative instruction set compiler 1308 to generate alternative instruction set binary code 1310 that may be natively executed by a processor without at least one x86 instruction set core 1314 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1312 is used to convert the x86 binary code 1306 into code that may be natively executed by the processor without an x86 instruction set core 1314. This converted code is not likely to be the same as the alternative instruction set binary code 1310 because an instruction converter capable of this is difficult to make; however, the converted code will accomplish the general operation and be made up of instructions from the alternative instruction set. Thus, the instruction converter 1312 represents software, firmware, hardware, or a combination thereof that, through emulation, simulation or any other process, allows a processor or other electronic device that does not have an x86 instruction set processor or core to execute the x86 binary code 1306.

For conventional approaches for maintaining coherency within DSM systems, software may have stale data for a DSM region in the cache of a node. For example, consider the following scenario with two nodes (i.e., a node is a server), node 0 and node 1. For a memory region A in DSM for a first operation, node 0 gets write permissions for region A. Node 0 modifies cache line X in region A and ensures durability with cache line write back to memory (CLWB) and pcommit instructions. At this point, X is still in the cache of node 0. For a second operation, node 1 gets write permission for region A. Node 1 modifies X. Note that X is still in the cache of node 0. For a third operation, node 0 gets write permissions again for region A. However, the value of X in the cache of node 0 is stale. This is one of several examples where software may have stale data for a DSM region in the cache of a node. This is an expected consequence of leaving the burden of coherency to software in a large scale distributed system. For conventional approaches, no ISA is available to help software handle coherency issues. To address this problem, embodiments of the present invention include a new instruction, CLINVALIDATE <addr1>, <size>, <domain> that invalidates all CL in [addr1,addr1+size], within <domain>. Here <domain> is an optional argument that is a bitmask of node identifiers within the distributed shared memory cluster for invalidating the caches. In one example, the default value is only the local caches. If <domain> is specified, then this invalidates caches of other remote nodes in the distributed shared memory cluster. Thus, the value of <domain> determines how many times a command is sent to invalidate the cache(s) (e.g., once for each node identifier).

In the expected implementation of DSM, while memory mapping or operating on an address range in DSM, the memory map returns a physical address pointer. Application software can use this pointer and the region size to issue an invalidation of cache lines within a range to prevent the problem of operating on stale cache lines. In the scenario previously discussed for the operations of Node 0 and Node 1, Node 0 could use this new instruction at the beginning of the third operation, or at the end of the first operation, or both because software developers may make mistakes.

The present design provides ISA support to invalidate all cache lines within a given address range. This is critical for applications in future fabric systems using distributed non-coherent shared memory with load/store semantics to remote nodes.

The present design includes a new instruction, cache line memory range invalidate, (CLINVALIDATE)<addr1>, <size>, <domain>. The instruction invalidates all cache lines in [addr1,addr1+size]. This is important for software in future fabric systems, which have nodes connected together with distributed shared memory, and load/store or get/put semantics to access remote memory. These nodes may be in coherent or non-coherent domains. Embodiments of the invention are particularly useful in the case of a non-coherent domain, as it provides software a means to be able to make sure it is not accessing stale cached data. In this DSM scenario, the use case of this new instruction, which can be considered a "clflush extension", will be common in order to keep consistency on the objects that the different software components (e.g., threads or processes) share over time, especially since coherency is not controlled by a hardware apparatus.

Caching Agents are coherency agents within a node that process memory requests from cores within the same node. Home Agents (HA) are the node clusters that are responsible for processing memory requests from the Caching Agents (CHA) and act as a Home for part of the memory address space. One die can have multiple Homes having a distributed address space mapping. Depending on the address space that requests are targeting, the requests may go to the same node's local memory or may go to an interconnect agent to route the request to the other processors within the same coherent domain or the requests may go to processors through the Fabric Interface that can be outside the coherent domain. In one example, all processors connected through interconnect belong to the same coherent domain. One system can include one or more coherent domains being all the coherent domains connected through fabric interconnect. For example, high-performance (HPC) or Data Centers include N clusters or servers that can communicate with each other using the fabric interconnect. Using the fabric interconnect, each coherent domain can expose some address regions to the other coherent domains. However, accesses between different coherent domains are not coherent. The present design includes a fabric interconnect that allows mapping address of memory ranges between different coherent domains.

For one conventional approach, flush and invalidation instructions are implemented for a server processor architecture. When a clflush instruction is executed, the core will propagate the request to CHA by generating a command to the CHA that controls the line being flushed. At this point, the CHA, using the system address decoder logic, will identify where the address space for the given address is being homed and will correspond to take the appropriate action. For example, the implementation includes requesting the core sending the request to send the data for that line to the remote socket owning it through interconnect, writing the data to memory or simply returning the acknowledge to invalid. Differently from the clflush flow, the invalidation (INV) flow will invalidate the line in the CHA and home structures and will acknowledge that the invalidation occurred. In this scenario the data is not sent back to memory or remotes.

In a DSM environment like the one targeted in the present design, enterprise applications will be working with memory objects exclusively and passing tokens around to other peers when the processing is done. However, before passing tokens, the software stack will have to invalidate the whole object to memory to be sure it is not stored in any cache hierarchy. Thus, a large number of invalidates and/or commands will be issued by the core and processed by the on die interconnect. The conventional implementations use hashing schemes to map address spaces in the CHA (e.g., SNC, hashing schemes, hemisphere or quadrant schemes, etc.) in order to provide better load balancing and distribution. Thus, consecutives addresses of an address range are usually distributed and controlled by different CHAs. Therefore, depending on the hashing scheme used in the architecture it is very likely that if one application wants to invalidate [@a, @a+1, . . . , @a+N] the core will eventually generate invalidate N different numbers of CHA.

The present design provides a new mechanism that lets the application invalidate a given address range that is mapped to a non-coherent address space with only one instruction. For example, this address range could correspond to a database object that the application was working on. Furthermore, the present design proposes a new extension on the on die interconnect protocol and on die interconnect architecture to provide an efficient implementation of such new functionality. In one example, this new mechanism allows an application to invalidate all cache lines within the region as soon as it memory maps a region and before the application begins any memory references. This way, there is no stale data from a previous mapping of the same region by the application.

In another example, the application invalidates with one instruction the whole object. To implement the previous instruction, two possible architectural options are proposed. The first option includes reusing existing mechanisms available in current and next generation of processor technologies. The second option includes extending current on die interconnect protocols to implement the novel instruction. The second option provides higher reutilization but less performance. Thereby it is desirable to minimize the complexity of exposing this new instruction.

As discussed herein, if the size specified in a memory range invalidate instruction (e.g., CLINVALIDATE instruction) is higher than K, then several instructions with an invalidating range will be generated to the corresponding caching agents. The software stack will need to be sure that the address provided as a parameter to the invalidate range is aligned to the granularity K provided by this scheme in the target architecture. Similarly, the provided size will be divisible by K although other optimizations could relax this condition.

The present design includes a new instruction to invalidate a memory range. This range can be divided in sub-ranges mapped on local range of memory, over fabric to one remote node, over fabric multiple nodes, or any combination of these sub-ranges.

Figure 14:
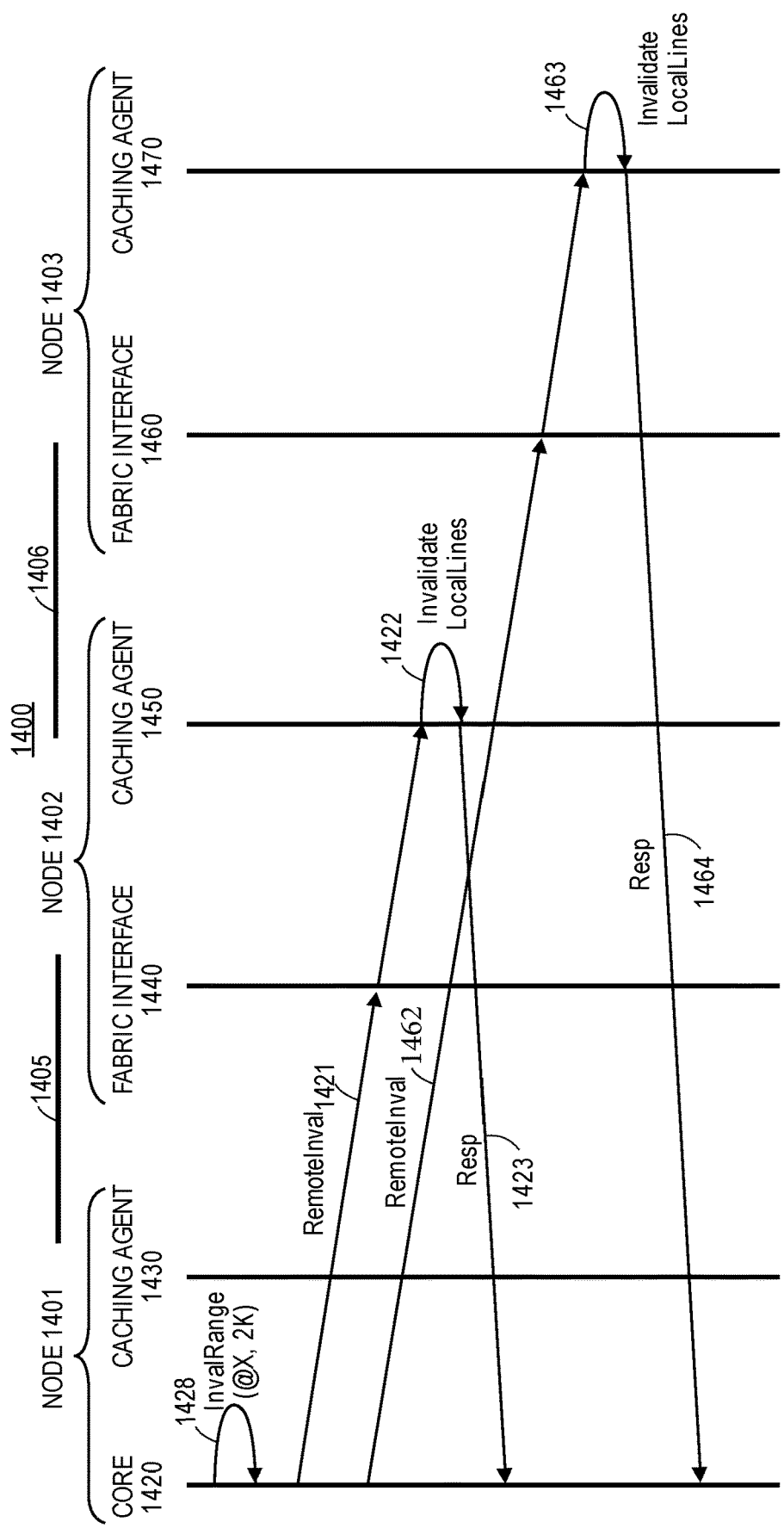
FIG. 14 illustrates a distributed shared memory fabric-connected system architecture 1400 that implements invalidation of a given memory range for this example in accordance with one embodiment.

In a first example, an invalidate instruction executing in node 1401 invalidates a memory range mapped in nodes 1402 and 1403. FIG. 14 illustrates a distributed shared memory fabric-connected system architecture 1400 that implements invalidation of a given memory range for this example in accordance with one embodiment. The system architecture 1400 includes a node 1401 having a core 1420 (e.g., processor core, IP core) and a caching agent 1430, a node 1402 having a fabric interface 1440 and a caching agent 1450, and a node 1403 having a fabric interface 1460 and a caching agent 1470. The nodes 1401-1403 can be communicatively coupled with interconnect (e.g., fabric interconnect 1405 and 1406 between different nodes). The nodes can be directly or indirectly coupled to each other. The memory range invalidate instruction 1421 (e.g., CLINVALIDATE @X, 2K) is executing in core 1420 as indicated with operation 1428. A memory range [@X,@X+k] is located in caching agent 1430 (e.g., node 2). The fabric invalidate instruction 1421 [@x,@x+K] is sent to a caching agent 1450 (e.g., node 1402) via fabric interface 1440 to invalidate this memory range as indicated with operation 1422. The caching agent 1450 sends a response message 1423 to the core 1423 to indicate invalidation of the memory range [@X, @X+k].

The fabric invalidate instruction 1462 is sent to a caching agent 1470 (e.g., node 1503) via fabric interface 1460 to invalidate the memory range [@X+k+1,@x+2k] at operation 1463. This range [@X+k+1,@x+2k] is located in caching agent 1470 (e.g., node 3). The caching agent 1470 sends a response message 1464 to the core 1420 to indicate invalidation of the memory range [@X+k+1,@X+2k].

Figure 15:
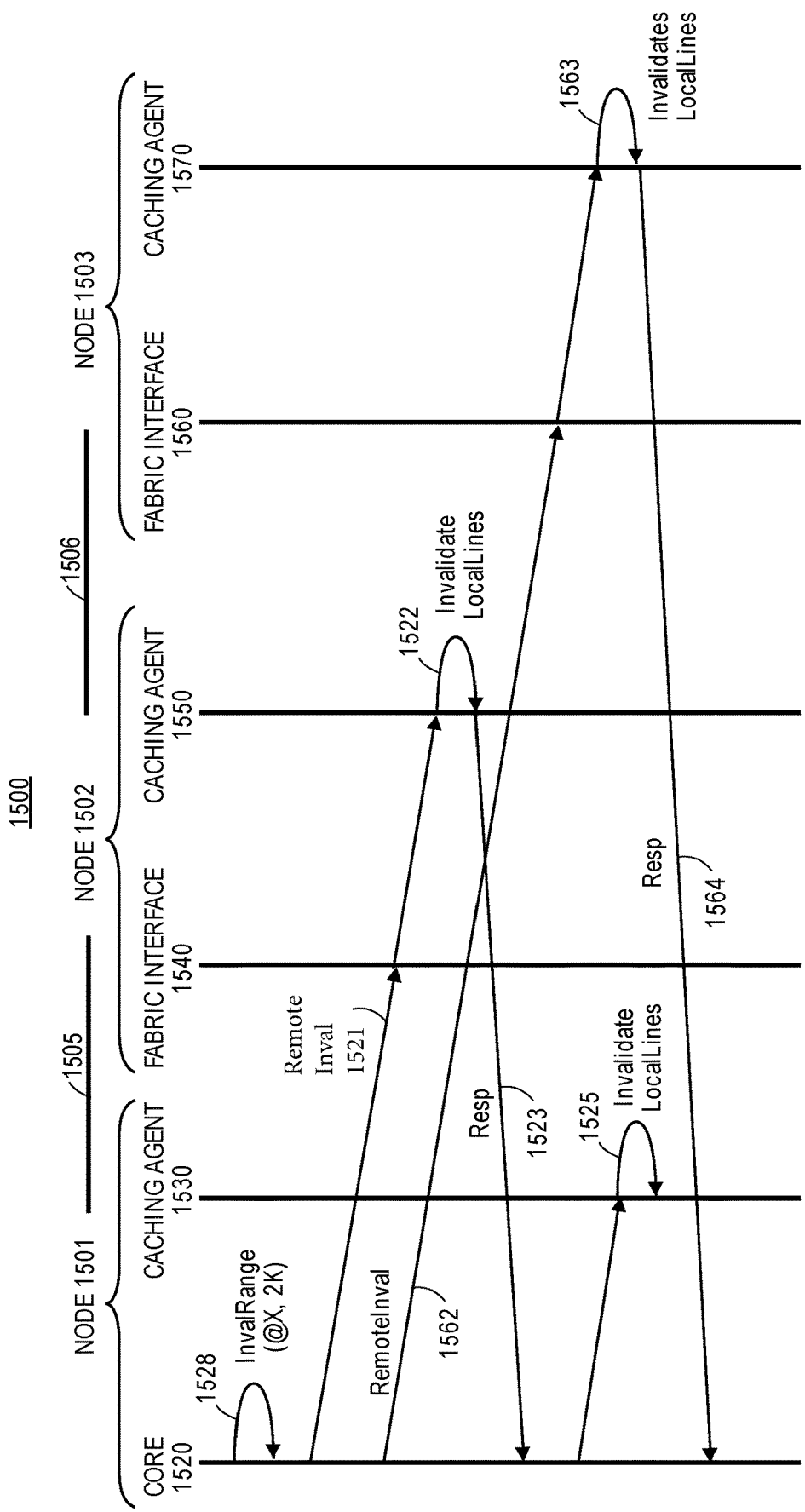
FIG. 15 illustrates a distributed shared memory fabric-connected system architecture 1500 that implements invalidation of a given memory range for this example in accordance with one embodiment.

In a second example, an invalidate instruction is used to invalidate a memory range mapped to a local node 1501 and node 1502 or node 1503. In a third example, the invalidate instruction is used to invalidate a memory range mapped to a local node 1501 and nodes 1502-1503. FIG. 15 illustrates a distributed shared memory fabric-connected system architecture 1500 that implements invalidation of a given memory range for this example in accordance with one embodiment. The system architecture 1500 includes the node 1501 having a core 1520 (e.g., processor core, IP core) and a caching agent 1530, the node 1502 having a fabric interface 1540 and a caching agent 1550, and the node 1503 having a fabric interface 1560 and a caching agent 1570. The nodes 1501-1503 can be communicatively coupled with interconnect (e.g., fabric interconnect 1505 and 1506 between different nodes). The nodes can be directly or indirectly coupled to each other.

The instruction (e.g., CLINVALIDATE @X, 2K, CLINVALIDATE @X, 3K) is executing in core 1520 as indicated with operation 1528. A memory range [@X,@X+k] is located in caching agent 1550 (e.g., node 1502) with the invalidate instruction 1521 being sent to the caching agent 1550 (e.g., node 1502) via fabric interface 1540 to invalidate this memory range as indicated with operation 1522. The caching agent 1550 sends a response message 1523 to the core 1520 to indicate invalidation of the memory range [@X,@X+k].

The fabric invalidate instruction 1562 is sent to a caching agent 1570 (e.g., node 1503) via fabric interface 1560 to invalidate the memory range [@X+k+1,@x+2k] at operation 1563. This range [@X+k+1,@x+2k] is located in caching agent 1570 (e.g., node 1503). The caching agent 1570 sends a response message 1564 to the core 1520 to indicate invalidation of the memory range [@X+k+1,@X+2k].

A memory range [@X+2k+1,@x+3k] is located in the local node 1501 with the invalidate instruction that is executing in the core 1520 causing the local caching agent 1530 of the local node to invalidate this memory range at operation 1525. A single invalidate instruction can cause any combination of the memory range invalidations for local and/or remote nodes (e.g., examples 2-3) as illustrated in FIG. 15.

In one example, the caching agents (e.g., caching agent 1430, 1450, 1470, 1530, 1550, 1570) of the present design can be integrated with shared cache units (e.g., shared cache units 506), interconnect unit (e.g., interconnect unit 512, 902), or bus controller units (e.g., bus controller units 516). In another example, the caching agents (e.g., caching agent 1430, 1450, 1470, 1530, 1550, 1570) of the present design can be associated with shared cache units (e.g., shared cache units 506), interconnect unit (e.g., interconnect unit 512, 902), or bus controller units (e.g., bus controller units 516).

For this present design, more changes would be needed in the architecture. Specifically extending the on die interconnect coherency protocol to cope with the new flow. Also the interface of the core would be extended to implement it. However, this architectural design provides more benefits with respect to existing once in terms of interconnect bandwidth used, core structures being used and simplicity to the software stack.

Figure 16:
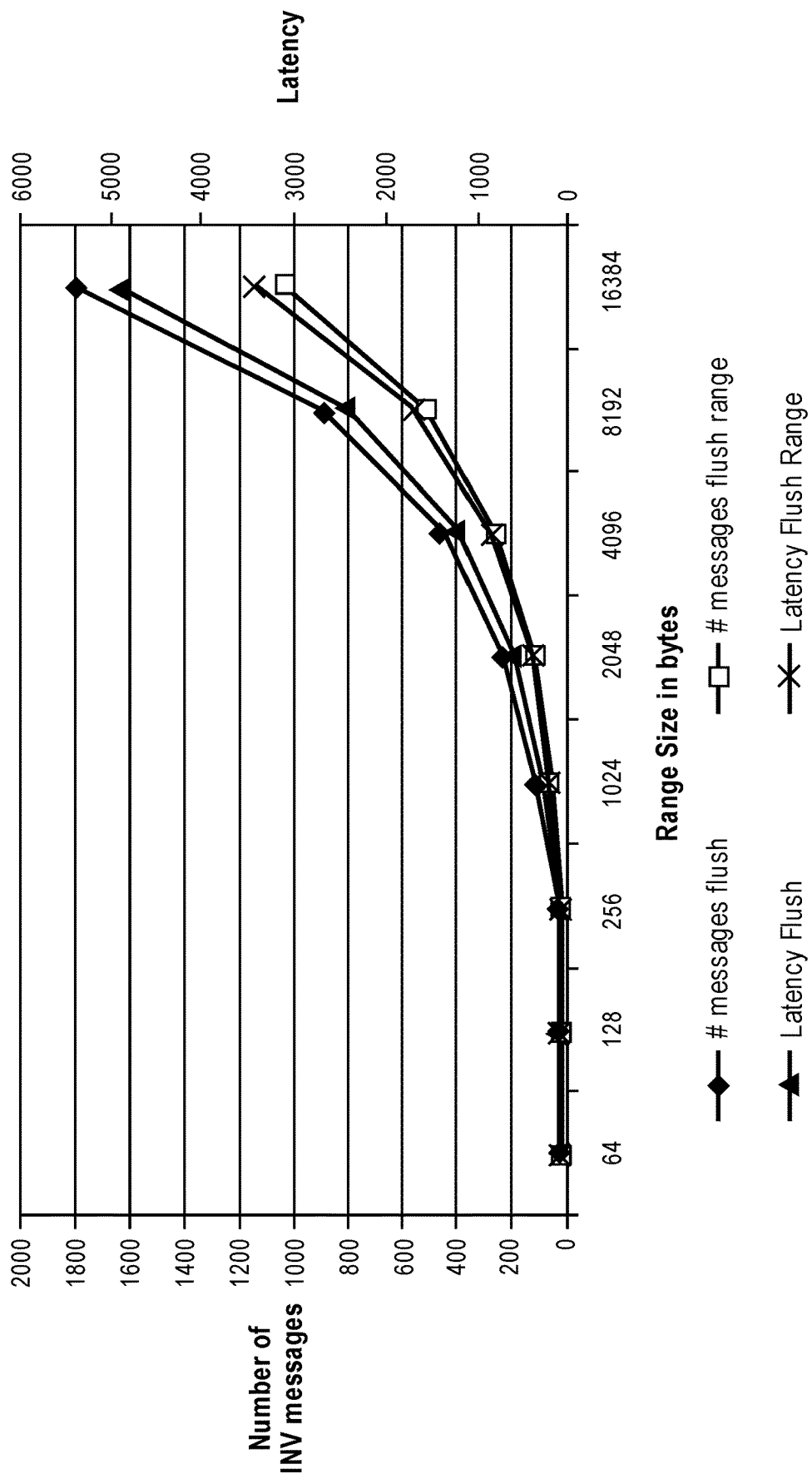
FIG. 16 shows a comparison between a line-by-line flushing (called "FLUSH") of an entire address range, compared with the present design (called "FLUSH range") which flushes the range with a single instruction in accordance with one embodiment.

Software developers cannot track cache lines modified by a software application on a line by line basis—not only is this cumbersome and inconvenient, it is also infeasible as software cannot account for cache lines within a memory region that are brought into the cache by the hardware prefetchers. Therefore, it is necessary to flush entire ranges of addresses that are mapped by software. Flushing an entire range on a line-by-line basis is also cumbersome, and also less efficient than the present design. FIG. 16 shows a comparison between a line-by-line flushing (called "FLUSH") of an entire address range, compared with the present design (called "FLUSH range") which flushes the range with a single instruction in accordance with one embodiment. FIG. 16 shows a comparison in terms of a number of messages needed to invalidate a memory range and its latency using "Flush" compared with "Flush range" of the present design. Clearly, a single instruction results in fewer messages. Even from a latency perspective, the present design is superior to flush. The present design provides a unique differentiation on distributed shared memory fabric-connected systems without hardware cache coherence.

Figure 17:
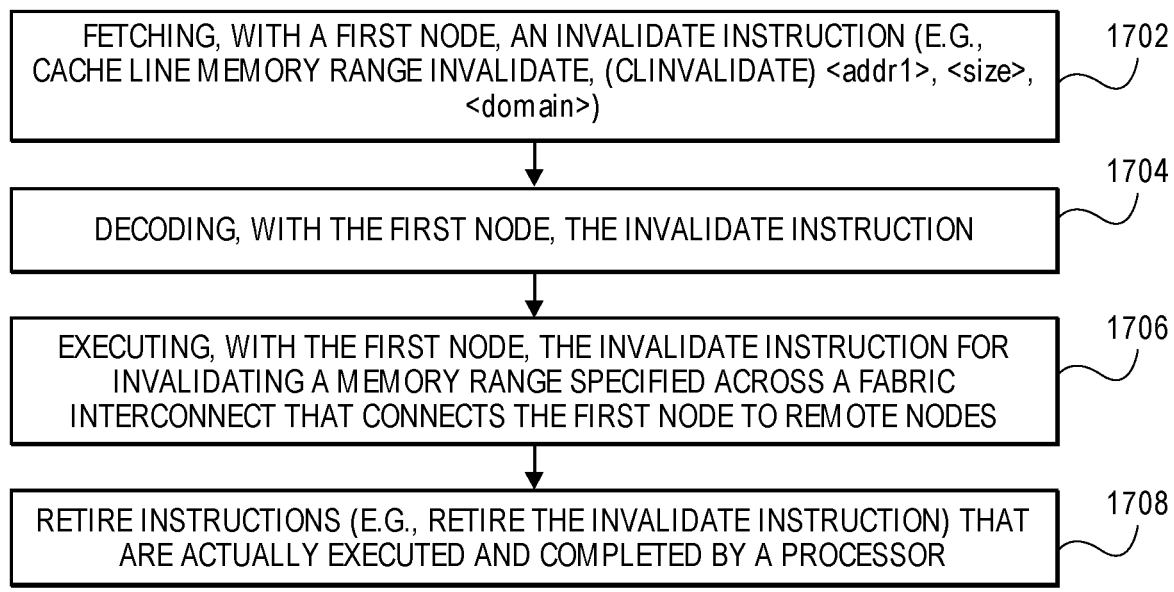
FIG. 17 illustrates a method 1700 for utilizing a distributed shared memory fabric-connected system architecture (e.g., 1400, 1500) that implements invalidation of a given memory range in accordance with one embodiment.

FIG. 17 illustrates a method 1700 for utilizing a distributed shared memory fabric-connected system architecture (e.g., 1400, 1500) that implements invalidation of a given memory range in accordance with one embodiment. At operation 1702, the method includes fetching, with a first node, an invalidate instruction (e.g., cache line memory range invalidate, (CLINVALIDATE)<addr1>, <size>, <domain>). The invalidate instruction includes address, size, and domain fields. At operation 1704, the method includes decoding, with the first node, the invalidate instruction. At operation 1706, the method includes executing, with the first node, the invalidate instruction for invalidating a memory range specified across a fabric interconnect that connects the first node to remote nodes. The domain field includes node identifiers to identify nodes having cache lines of the memory range to be invalidated. In one example, executing of the invalidate instruction causes invalidating a first subset of the memory range that is located at a second remote node and causes invalidating a second subset of the memory range that is located at a third remote node. Executing of the invalidate instruction can also cause invalidating a third subset of the memory range including a plurality of cache lines that is located at the first node. At operation 1708, the method optionally includes a retire unit to retire instructions (e.g., invalidate instruction) that are actually executed and completed by a processor.

Figure 18:
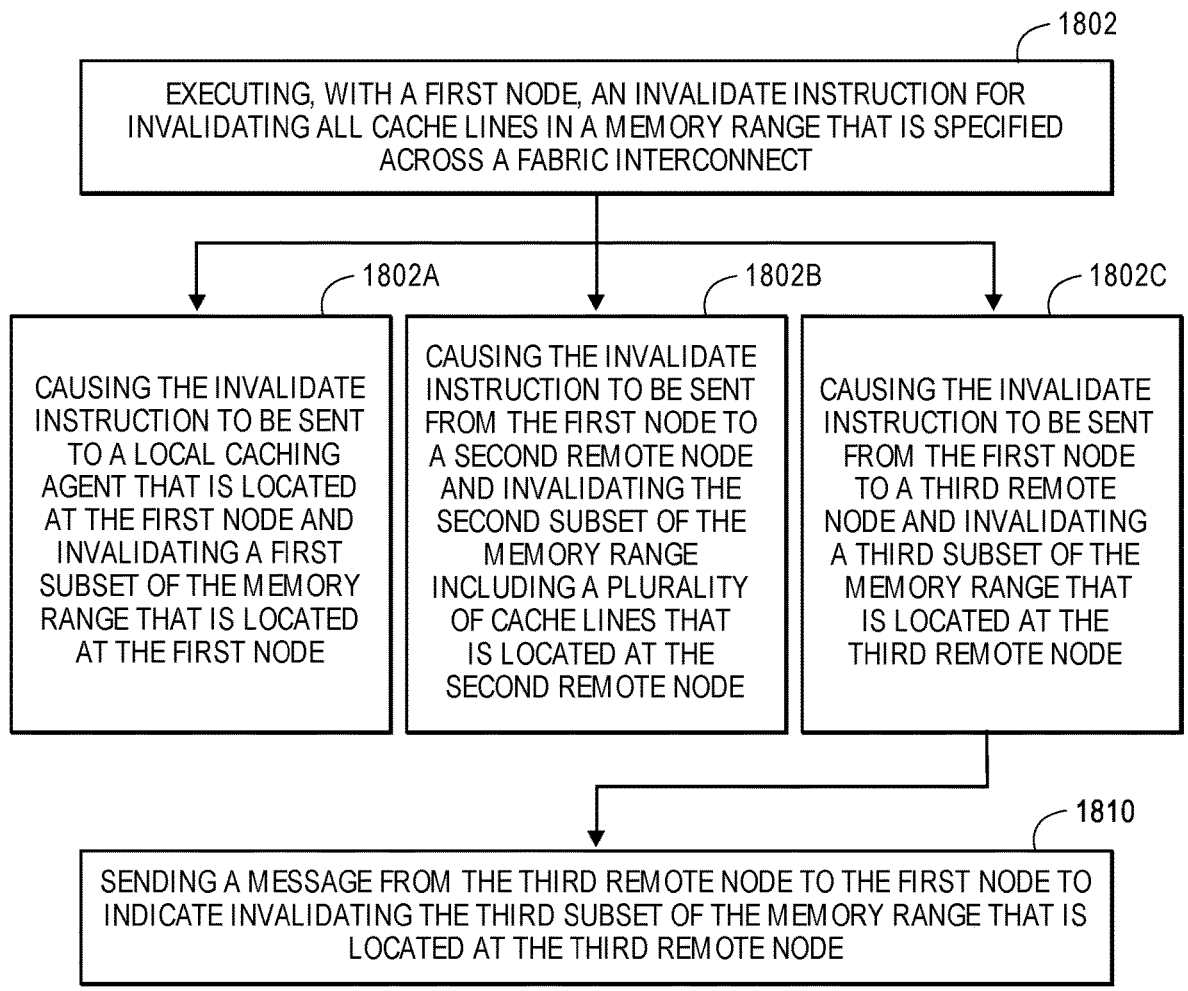
FIG. 18 illustrates a method 1800 for utilizing a distributed shared memory fabric-connected system architecture (e.g., 1400, 1500) that implements invalidation of a given memory range in accordance with one embodiment.

FIG. 18 illustrates a method 1800 for utilizing a distributed shared memory fabric-connected system architecture (e.g., 1400, 1500) that implements invalidation of a given memory range in accordance with one embodiment. At operation 1802, the method 1800 includes executing, with a first node, an invalidate instruction for invalidating all cache lines in a memory range that is specified across a fabric interconnect. Operations 1802a, 1802b, and 1802c are sub-operations of the operation 1802 and these operations 1802a, 1802b, and 1802c may occur in parallel at approximately the same time or sequentially in any order. Executing of the invalidate instruction (e.g., cache line memory range invalidate, (CLINVALIDATE)<addr1>, <size>, <domain>) at operation 1802 causes sending the invalidate instruction to a local caching agent that is located at the first node and invalidating a first subset of the memory range that is located at the first node at operation 1802a. Executing of the invalidate instruction at operation 1802 also causes sending, with a fabric interconnect from the first node to a second remote node, the invalidate instruction and invalidating the second subset of the memory range including a plurality of cache lines that is located at the second remote node at operation 1802b. In one example, the first node includes at least one processor core and the second node includes a caching agent. The invalidate instruction for invalidating a memory range can cause all cache lines in the memory range to be invalidated including a plurality of cache lines for the first subset of the memory range. Executing of the invalidate instruction at operation 1802 also causes sending, with a fabric interconnect from the first node to a third remote node, the invalidate instruction and invalidating a third subset of the memory range that is located at the third remote node at operation 1802c. At operation 1810, the method 1800 includes sending a message from the third remote node to the first node to indicate invalidating the third subset of the memory range that is located at the third remote node.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Embodiments of the present invention may be implemented as any one or a combination of: one or more microchips or integrated circuits interconnected using a parent-board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Thus, techniques for performing one or more instructions according to at least one embodiment are disclosed. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

The following examples pertain to further embodiments. Example 1 is a machine-readable medium having stored thereon at least one instruction, which when performed by a machine causes the machine to perform a method comprising decoding, with a first node, an invalidate instruction and executing, with the first node, the invalidate instruction for invalidating a memory range specified across a fabric interconnect.

In example 2, the subject matter of example 1 can optional include the invalidate instruction comprising node identifiers to identify nodes having cache lines of the memory range to be invalidated.

In example 3, the subject matter of any of examples 1-2 can optionally include executing of the invalidate instruction causing invalidating a first subset of the memory range that is located at a second remote node and causing invalidating a second subset of the memory range that is located at a third remote node.

In example 4, the subject matter of any of examples 1-3 can optionally include executing of the invalidate instruction that causes invalidating a third subset of the memory range including a plurality of cache lines that is located at the first node.

In example 5, the subject matter of any of examples 1-4 can optionally include the first node comprising at least one processor core. The second and third nodes each comprise a caching agent.

In example 6, the subject matter of any of examples 1-5 can optionally include the invalidate instruction for invalidating a memory range causing all cache lines in the memory range to be invalidated including a plurality of cache lines for the first subset of the memory range.

Example 7 is a system comprising a caching agent and at least one processor core of a first node coupled to the caching agent. The at least one processor core to decode an invalidate instruction and to execute the invalidate instruction for invalidating a memory range specified across a fabric interconnect.

In example 8, the subject matter of example 7 can optionally include a second node to receive the invalidate instruction and to invalidate a first subset of the memory range that is located at the second remote node when the invalidate instruction executes.

In example 9, the subject matter of any of examples 7-8 can optionally include the first node comprising the at least one processor core.

In example 10, the subject matter of any of examples 7-9 can optionally include the second node comprising a caching agent.

In example 11, the subject matter of any of examples 7-10 can optionally include the invalidate instruction for invalidating a memory range causing all cache lines in the memory range to be invalidated including a plurality of cache lines for a second subset of the memory range.

In example 12, the subject matter of any of examples 7-11 can optionally include a third remote node to send a message to the first node to indicate invalidating a third subset of the memory range that is located at the third remote node.

Example 13 is a distributed shared memory system comprising a first remote caching agent having a first subset of a memory range, a fabric interconnect coupled to the first remote caching agent, and at least one processor core coupled over the fabric interconnect to the first remote caching agent. The at least one processor core to decode an invalidate instruction and to execute the invalidate instruction for invalidating the memory range specified across the fabric interconnect.

In example 14, the subject matter of example 13 can optionally include a second remote caching agent coupled to the fabric interconnect. The second remote caching agent to receive the invalidate instruction for invalidating a second subset of the memory range that is located at the second remote caching agent and to invalidate the second subset of the memory range including a plurality of cache lines that is located at the second remote caching agent.

In example 15, the subject matter of any of examples 13-14 can optionally include the at least one processor core to execute the invalidate instruction to invalidate a third subset of the memory range including a plurality of cache lines that is local to the at least one processor core.

In example 16, the subject matter of any of examples 13-15 can optionally include the invalidate instruction for invalidating a memory range causing all cache lines in the memory range to be invalidated including a plurality of cache lines for the first subset of the memory range that is located at the first remote caching agent.

In example 17, the subject matter of any of examples 13-16 can optionally include the at least processor core having a different coherency domain than the first remote caching agent.

Example 18 is a processor comprising a local caching agent and at least one processor core coupled to the local caching agent. The at least one processor core to decode an invalidate instruction and to execute the invalidate instruction for invalidating a memory range specified across the fabric interconnect.

In example 19, the subject matter of example 18 can optionally include the at least one processor core to send the invalidate instruction for invalidating a first subset of the memory range to the local caching agent and to invalidate the first subset of the memory range that is located at the local caching agent. The at least one processor core to send the invalidate instruction for invalidating a second subset of the memory range to a remote caching agent that is located remotely from the processor.

In example 20, the subject matter of any of examples 18-19 can optionally include the invalidate instruction causing invalidating of the second subset of the memory range including a plurality of cache lines that is located at the remote caching agent.

In example 21, the subject matter of any of examples 18-20 can optionally include the invalidate instruction causing all cache lines in the memory range to be invalidated including a plurality of cache lines for the first subset of the memory range.

What is claimed is:
1. An apparatus comprising:
  a decoder of a processor core in a local node configured to decode an invalidate instruction, the invalidate instruction specifying a memory range mapped to at least a first memory subrange of a first node in a first coherency domain and a second memory subrange of a second node in a second coherency domain; and
  an execution unit of the processor core configured to execute the invalidate instruction to invalidate the memory range specified by the invalidate instruction, wherein responsive to execution of a single instance of the invalidate instruction, the execution unit is configured to cause the processor core to transmit a first invalidate request to a first caching agent of the first node to invalidate the first memory subrange in the first coherency domain and a second invalidate request to a second caching agent of the second node to invalidate the second memory subrange in the second coherency domain.

2. The apparatus of claim 1, wherein the invalidate instruction comprises a memory address operand and a size operand to specify the memory range.

3. The apparatus of claim 2, wherein the invalidate instruction further comprises a domain operand to specify nodes to which invalidate requests are to be sent.

4. The apparatus of claim 3, wherein the execution unit is configured to cause transmission from the processor core an invalidate request to each node specified by the domain operand.

5. The apparatus of claim 1, wherein responsive to the first invalidate request, the first caching agent is configured to invalidate all cache lines at the first node that are in the first memory subrange.

6. The apparatus of claim 1, wherein responsive to the second invalidate request, the second caching agent is configured to invalidate all cache lines at the second node that are in the second memory subrange.

7. The apparatus of claim 1, wherein the first and second invalidate requests are sent over a fabric interconnect.

8. The apparatus of claim 1, wherein the first caching agent is configured to transmit a first response message to the processor core to indicate successful invalidation of the first memory subrange.

9. The apparatus of claim 1, wherein the second caching agent is configured to transmit a second response message to the processor core to indicate successful invalidation of the second memory subrange.

10. A method comprising:
   decoding, by a decoder of a processor core in a local node, an invalidate instruction, the invalidate instruction specifying a memory range mapped to at least a first memory subrange of a first node in a first coherency domain and a second memory subrange of a second node in a second coherency domain;
   executing, by an execution unit of the processor core, a single instance of the invalidate instruction to invalidate the memory range specified by the invalidate instruction; and
   responsive to the execution of the single instance of the invalidate instruction, transmitting, from the processor core, a first invalidate request to a first caching agent of the first node to invalidate the first memory subrange and a second invalidate request to a second caching agent of the second node to invalidate the second memory subrange.

11. The method of claim 10, wherein the invalidate instruction comprises a memory address operand and a size operand to specify the memory range.

12. The method of claim 11, wherein the invalidate instruction further comprises a domain operand to specify nodes to which invalidate requests are to be sent.

13. The method of claim 12, further comprises transmitting, from the processor core, an invalidate request to each node specified by the domain operand.

14. The method of claim 10, further comprises invalidating all cache lines at the first node that are in the first memory subrange responsive to the first invalidate request.

15. The method of claim 10, further comprises invalidating all cache lines at the second node that are in the second memory subrange responsive to the second invalidate request.

16. The method of claim 10, further comprises sending the first and second invalidate requests over a fabric interconnect.

17. The method of claim 10, further comprises transmitting a first response message to the processor core to indicate successful invalidation of the first memory subrange.

18. The method of claim 10, further comprises transmitting a second response message to the processor core to indicate successful invalidation of the second memory subrange.

19. A non-transitory machine-readable medium having program code stored thereon which, in response to being executed by a machine, causes the machine to perform operations of:
   decoding, by a decoder of a processor core in a local node, an invalidate instruction, the invalidate instruction specifying a memory range mapped to at least a first memory subrange of a first node in a first coherency domain and a second memory subrange of a second node in a second coherency domain;
   executing, by an execution unit of the processor core, a single instance of the invalidate instruction to invalidate the memory range specified by the invalidate instruction; and
   responsive to the execution of the single instance of the invalidate instruction, transmitting, from the processor core, a first invalidate request to a first caching agent of the first node to invalidate the first memory subrange and a second invalidate request to a second caching agent of the second node to invalidate the second memory subrange.

20. The non-transitory machine-readable medium of claim 19, wherein the invalidate instruction comprises a memory address operand and a size operand to specify the memory range.

21. The non-transitory machine-readable medium of claim 20, wherein the invalidate instruction further comprises a domain operand to specify nodes to which invalidate requests are to be sent.

22. The non-transitory machine-readable medium of claim 21, wherein the operations further comprise transmitting, from the processor core, an invalidate request to each node specified by the domain operand.

23. The non-transitory machine-readable medium of claim 19, wherein the operations further comprise invalidating all cache lines at the first node that are in the first memory subrange responsive to the first invalidate request.

24. The non-transitory machine-readable medium of claim 19, wherein the operations further comprise invalidating all cache lines at the second node that are in the second memory subrange responsive to the second invalidate request.

25. The non-transitory machine-readable medium of claim 19, wherein the operations further comprise sending the first and second invalidate requests over a fabric interconnect.

* * * * *